United States Patent [19]
Proctor et al.

[11] Patent Number: 6,097,736
[45] Date of Patent: *Aug. 1, 2000

[54] TELECOMMUNICATIONS NETWORK

[75] Inventors: Richard John Proctor; Thomas Slade Maddern, both of Wimborne; Michael Denis Batts, Poole, all of United Kingdom

[73] Assignee: Marconi Communications Limited, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/498,090

[22] Filed: Jul. 5, 1995

[30] Foreign Application Priority Data

Jul. 7, 1994 [GB] United Kingdom .................... 9413716

[51] Int. Cl.$^7$ .................................................. H04L 12/56
[52] U.S. Cl. ............................................ 370/480; 370/395
[58] Field of Search .................................. 370/69.1, 94.1, 370/94.2, 60, 60.1, 85.13, 85.1, 84, 18, 120, 110.1, 321, 320, 319, 330, 337, 338, 342, 343, 344, 347, 349, 350, 441, 442, 480, 395, 397, 376, 465, 468, 471, 475, 477, 478, 503, 498, 399, 401, 396, 391, 390, 389; 375/200; 455/33.1, 33.2, 33.3; 379/60, 59, 93, 94, 95, 96; 348/7, 6, 12, 16, 384, 441; 359/139, 146, 147, 123, 124, 128, 135, 115

[56] References Cited

U.S. PATENT DOCUMENTS

| | | | |
|---|---|---|---|
| 4,534,024 | 8/1985 | Maxemchuk et al. | 370/445 |
| 5,195,090 | 3/1993 | Bolliger et al. | 370/60 |
| 5,305,308 | 4/1994 | English et al. | 370/60 |
| 5,418,785 | 5/1995 | Olshansky et al. | 370/452 |

FOREIGN PATENT DOCUMENTS

| | | |
|---|---|---|
| 0 400 959 | 12/1990 | European Pat. Off. . |
| 0 533 391 A2 | 3/1993 | European Pat. Off. . |

*Primary Examiner*—Dang Ton
*Attorney, Agent, or Firm*—Kirschstein, et al.

[57] ABSTRACT

A communications network using Asynchronous Transfer Mode has a head end unit connected to a plurality of groups of network terminations wherein the frequency spectrum of the network is divided into a number of frequency bands, one band of which forms a start-up band used for start-up and configuration of a network termination, the remaining bands each being used for communication between the head end unit and the network terminations within a group subsequent to start-up and configuration. The network may be a Passive Optical Network.

12 Claims, 16 Drawing Sheets

Fig.6.

| NUMBER OF CELLS OF HIGH PRIORITY WANTED 0-255 | NUMBER OF CELLS OF LOW PRIORITY WANTED 0-255 |
|---|---|

Fig.8.

| PHASE | CODING | INTERPRETATION |
|---|---|---|
| 1 | 110 FRAME | USED TO IDENTIFY EACH FRAME, AND INFORM WHICH NT TO SEND ITS CONTROL SLOT |
| 2 | 100NT | THE IDENTIFIED NT CAN SEND A CELL |
|   | 10100000 | ANY NEW NT'S ? |
|   | 10111111 | NO NT'S TO SEND A CELL |
| 3 | OXXXXXXX | SIMILAR TO PHASE 2 BUT FOR HIGHER BANDWIDTH UPSTREAM DATA RATES |

| VPI FIELD (12 BIT FORMAT) | INTERPRETATION |
|---|---|
| 0000 0000 0000 | IDLE CELLS NORMALLY |
| 0000 0000 0001 | USED FOR CONTROL PURPOSES TO ALL NTs |
| 0000 0001 POTS | POTS CELL |
| 0000 001N NNNN | INTERNAL CONTROL TO NT NNNNN |
| 01BB BBBB BBBB | BROADCAST CELL ON CHANNEL BBBBBBBBBB |
| 1NNN NNxx xxxx | POINT TO POINT CELL TO NT NNNNN ON VPI xxxxxx |
| OTHERS | RESERVED FOR FUTURE |

- DISCRETE COMPONENTS FOR RINGING etc.
- EXPANSION RAM IF NEEDED
- NT ASIC
- CONNECTORS FOR FIBRE
- PHONE JACK
- CONNECTING POINT FOR PHONE WIRING
- BATTERY
- EXPANSION SOCKET DRIVES UTOPIA BUS (AND PROCESSOR BUS) OR SERIAL ATM INTERFACE

- TERMINAL ADAPTER UNITS PLUGGED IN
- BATTERY
- NT ASIC
- EXPANSION SOCKETS
- EXTRA RAM FOR ADDITIONAL NT MODULES

Fig.20.
| RANGE (km) | MAXIMUM BANDWIDTH AT TRAFFIC PRIORITY |
|---|---|
| 0 - 200 | 50M |
| 300 | 33M |
| 400 | 25M |
| 500 | 20M |
| 1000 | 10M |
Fig.21.
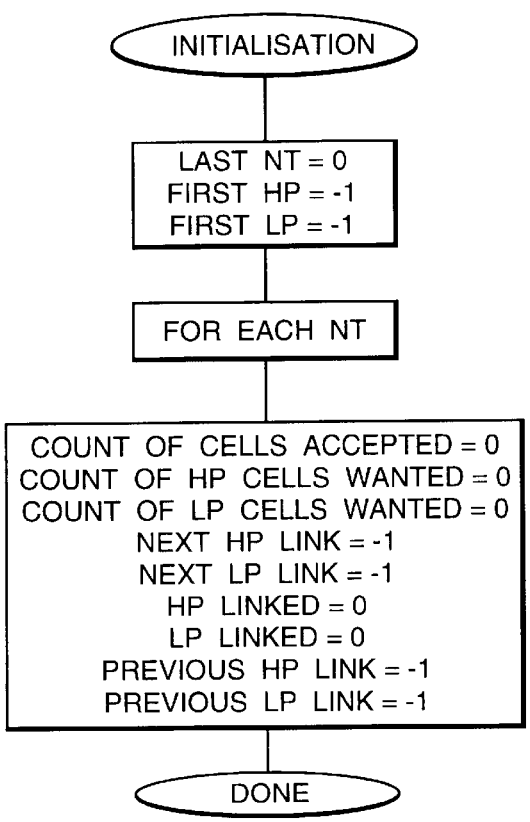
Fig.22.
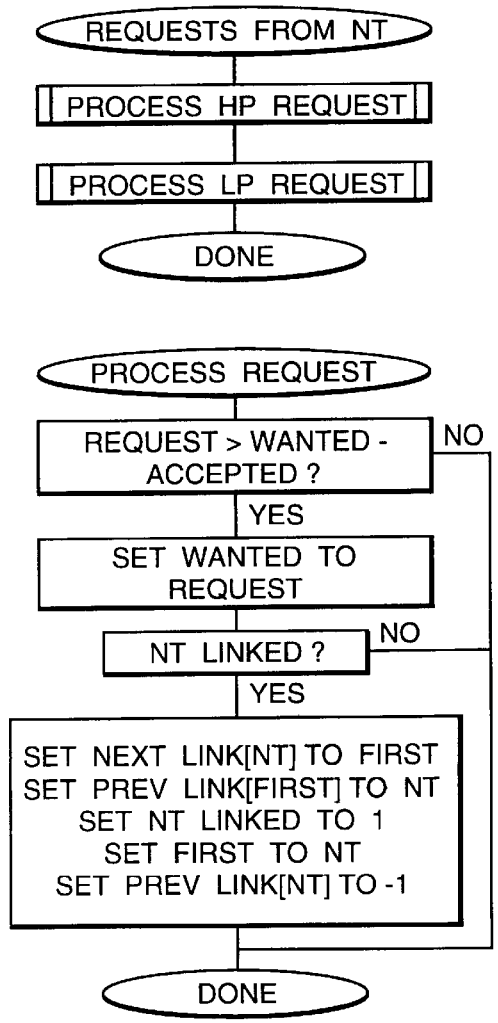

6,097,736

TELECOMMUNICATIONS NETWORK

BACKGROUND OF THE INVENTION

The present invention relates to an Asynchronous Transfer Mode (ATM) based network system to handle up to 50M of bidirectional traffic for each customer. The network can scale from a few customers to 1000+ customers using active and/or passive splitting and utilises the best aspects of sub carrier multiplexes, Time Division Multiple Access (TDMA) and ATM while avoiding the problems of these technologies.

The Architecture handles groups of up to 32 customers sharing the ATM bandwidth of a common ATM pipe, many groups co-existing on the same system. Special provision is made for Plain Old Telephone System (POTS) to reduce the delays so that ordinary telephony will work.

SUMMARY OF THE INVENTION

According to the present invention there is provided an Communications Network using Asynchronous Transfer Mode (ATM) comprising a head end unit connected to a plurality of groups of network terminations wherein the frequency spectrum of the network is divided into a number of frequency bands, one band of which forms a start-up band used for start-up and configuration of a network termination, the remaining bands each being used for communication between the head end unit and the network terminations within a group subsequent to start-up and configuration.

The network may be a Passive Optical Network.

BRIEF DESCRIPTION OF THE DRAWINGS

The present invention will now be described by way of example, mainly with reference to a Passive Optical Network, though it is generally applicable also to a cable network, such as a cable TV network, with reference to the accompanying draiwngs, in which:

FIG. 6 shows a cell coding system for an upstream control signal;

FIG. 8 shows the coding system for a downstream control signal;

FIG. 9 illustrates the start-up sequence for a network termination at power on;

FIG. 20 illustrates the relationship between range and bandwidth;

FIG. 21 shows a flow control algorithm;

FIG. 22 shows algorithms for handling call requests from a network termination;

DETAILED DESCRIPTION

Basic Architecture

Figure 1:
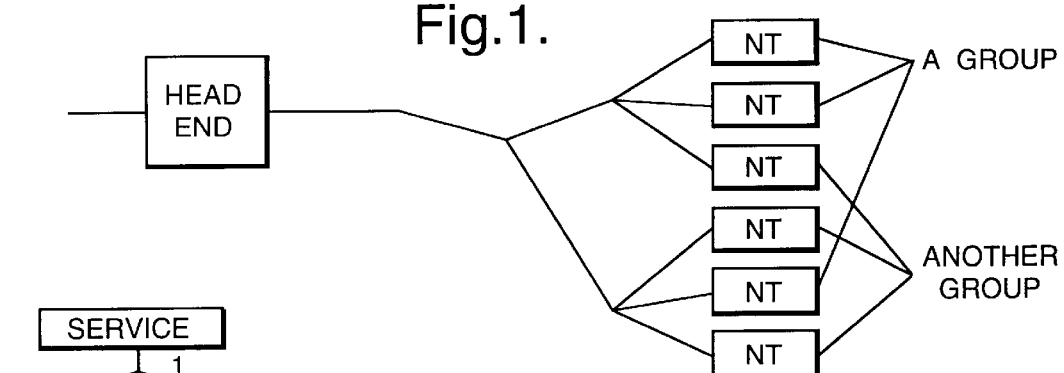
FIG. 1 shows a block diagram of the basic network of the present invention.

The basic network concept is as in FIG. 1, a head end supports a number of Network Terminations (NTs) across an optic network with passive and optionally active splitters. Although in principle, it is designed to operate at a range of up to 200 km, this system could operate to a longer range, provided that the variation in the range was less than 200 km.

The system as described operates with two optical fibres, one for each direction. This is regarded as cheaper at the moment, though in principle this could work with one bidirectional fibre if this was appropriate.

The transmission on the fibres is divided into bands, each band consists of one sub carrier used for both ATM and for control.

One band is reserved for start-up and management, each of the bands can support a group of up to 32 customers.

Figure 2:
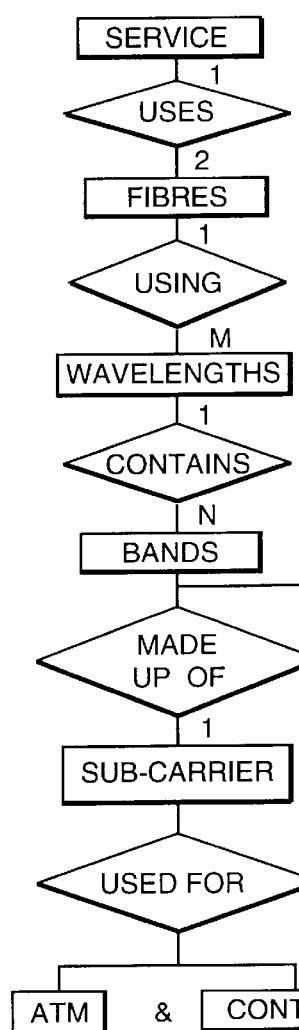
FIG. 2 shows the relationships existing in the network of FIG. 1.
Figure 2:
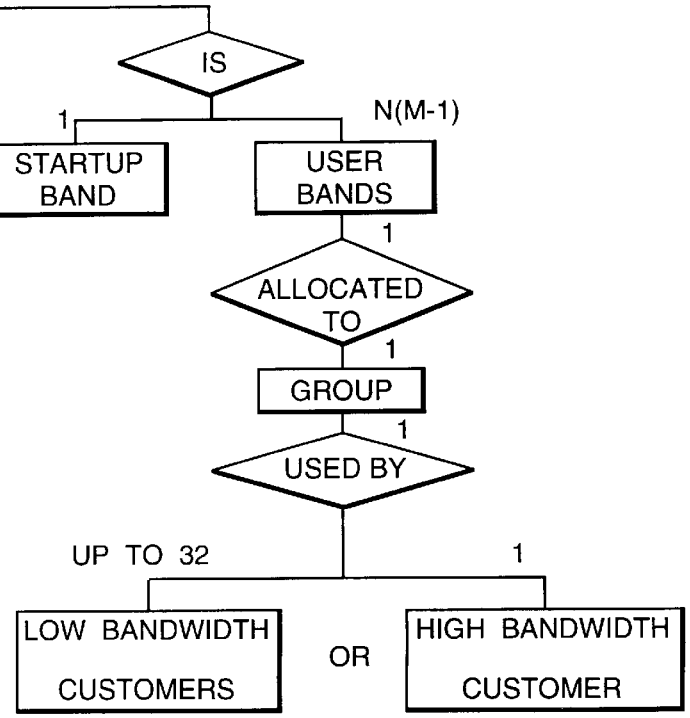

FIG. 2 shows the relationship between services, fibres, bands, carriers and customers.

Over a fibre that could be split 1000 ways both actively and passively, the PON will provide a number of bands. Each band will consist of a sub carrier one used for both ATM and for control. One band is used for start-up, the rest are assigned to groups of up to 32 customers.

The ATM pipe is asymmetrical and will initially share about 150M downstream and about 50M upstream. It would be possible to use a pair of carriers, this would reduce the power of the NT but increase the complexity of the receivers and transmitters. On balance it is now considered more efficient to use one sub carrier.

Figure 3:
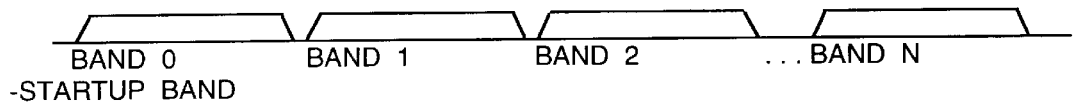
FIG. 3 shows a typical optical fibre frequency band distribution.

Over the fibre there can be many bands as shown in FIG. 3, one of which, the start-up band, is dedicated to start and initial configuration. As more customers are added more groups can be added on new bands.

In the downstream direction a small amount of control and framing is added to the front of a cell. In the upstream direction, there are alternate small and large slots, the large slots carry an ATM cell, the small slots allow each of the NTs in turn to communicate their control requirements. Each slot has a guard band and a preamble to allow the timing to be determined.

The PON downstream delivers cells to the NT which selects those that it needs and processes them. In the upstream there is a simple TDMA system operated with wide guard bands. The initial ranging is performed on a management group so that it does not interfere with normal traffic. Once the link is up the head end can notice any drift and send new ranging data as needed.

Customer identification and security is based on a unique identity in each NT. This is not customer accessible or interceptible.

Terminology

GROUP Up to 32 customers sharing the same ATM pipes and same frequency bands.

START-UP GROUP Those NTs being started up

ATM PIPE A carrier of ATM e.g. 155M, 51M

BANDS A subcarrier on the PON, carrying ATM and control.

UPSTREAM Data travelling from the NT to the Head end

DOWNSTREAM Data travelling from the Head End and the Network to the NT and beyond.

ATM Pipes

Figure 4:
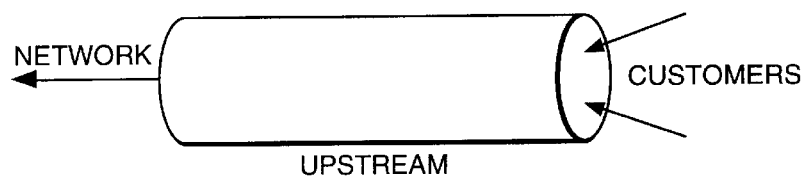
FIG. 4 shows a diagrammatic representation of a pair of ATM pipes as used in the present invention.

The concept is that each group on the PON will operate two separate logical ATM pipes as shown in FIG. 4: one from the network to the customers and one from the customers to the network. Each pipe will operate on ATM dividing the capacity between the circuits used by the customers. The capacity of the downstream pipe is larger than the upstream pipe.

There will be a number of separate groups with their own ATM pipes in each direction to serve a lot of customers or heavy traffic loads. Each ATM pipe is carried in its own frequency band using sub-carrier multiplexing.

The number of pipes actually equipped on a PON would depend upon the maximum traffic load that the PON had to carry. Equipment can be added at the head end to support more groups, as customers take up service or their bandwidth requirements increase. The number of customers allocated to a group would depend upon the total load that they require which would provide an efficient and flexible approach. An advantage of this approach is that it minimises the initial installation cost and make the design of the equipment relatively simple because each ATM pipe is working at a relatively low rate within the capabilities of current standard Application Specific Integrated Circuits (ASICs).

This system could also work in a hybrid fibre/coax network where there are bandwidth restrictions on the final coax drops. In this case the groups can be set to fit in the available bandwidth slots on an existing cable TV network. Where there is a high capacity coax or optical fibre main feed then this is capable of carrying multiple groups in different frequency bands. These are then selectively patched onto the final coax drops by heterodyning and filtering.

The allocation of cell slots in both downstream and upstream directions is controlled by the head end. A control protocol is used to allow NTs to request upstream cell capacity in order to support dynamically varying circuits. The control protocol also supports ranging and the necessary configuration actions on subscriber's NTs and identification numbers.

Synchronous Operation

The whole system operates synchronously with the Standard ATM 8 KHz framing, having 32 timeslots over two frames. Each timeslot corresponds with 3 cells down, 1 cell up, and requests by one NT to send cells. By operating this way the operation is deterministic and the framing is relatively simple to handle. This is because there are an integral number of cells in a frame, and as it is a multiple of 16 it eliminates the requirement for complex framing, which would be the case if it operated at exactly Synchronous Digital Hierarchy (SDH) rates.

Carriers

One carrier (the start-up group) is used during start-up and ranging, other carriers are used for each traffic group.

An NT is assigned to a group depending on its peak traffic requirements. The group of NTs shares the capacity of upstream and downstream ATM pipes. Associated with the ATM pipes are upstream and downstream control links. Each ATM pipe or control link is carried in a separate sub carrier frequency. Other groups of NTs will be allocated their own set of sub carrier frequencies.

The start-up group is used for start, download and configuration of the NTs when they are installed, activated or reactivated. Since normally only one NT will be undergoing activation at a time then the timing can be relaxed to provide large gaps for ranging. The NTs will initially tune their channels to the start bands so that ranging can be performed and a working channel identity given to them. Once this process is complete they will be allocated to an appropriate NT group and will retune their channels for that group. If even an NT loses track of its key operational parameters it can tune into the start control channels, or it may be commanded to do so by the head end if it needs a major initialisation such as basic ranging. If NTs clash on the start control channel then they will back off for a random time and try again, which is similar in principle to Ethernet class resolution.

ATM PIPES

There is a separate ATM pipe in each direction of transfer i.e. upstream and downstream. The downstream pipe is set nominally at about 155 Mbit/.s capacity, while the upstream pipe is one third of this at about 51 Mbit/s. These values are suggestions taking a first pass estimate of what is considered to be a workable capacity for the envisaged services and could be easily scaled up or down. The actual ATM data rates are marginally above this to allow an integral number of cells per frame.

Downstream

The downstream direction is relatively straightforward since only the head end has to transmit cells. In addition to raw cells 53 bytes long, there will cell delineation framing, error detection coding and timing information for synchronisation of the NTs timing both at the it, frame and multiframe level. It is assumed that this stream will operate at 48 cells per 125 microsecond frame in order to make operation simple. This also makes it capable of a preallocated locked operation.

The head end determines from the traffic presented to it for each group of NTs under its control which cell to send next. It is possible to permanently assign cells to slots if required and apply multiple levels of priorities to cells. If cell allocation were done over 5⅓ frames (48 frames of SDH, 252 cells) then one cell needs to be allocated per column of SDH tributary being transported. The minimum number would be 3 or 4 cells for 1.5 Mbit/s and 2 Mbit/s respectively giving a worse case packetisation delay of around 225 microseconds (168 microseconds for 2 Mbit/s).

The Virtual Path Identifier/Virtual Channel Identifier (VPI/VCI) fields can be used in the ATM cell header by the NTs to determine if the cell is destined for them. It is intended to provide a multicast capability on the PON itself in order to conserve bandwidth. Thus all NTs that want it will pick up the one copy of a cell when it is transmitted. This will provide considerable savings for popular broadcast video channels. So that NTs may conserve power if their cell rate is low then the downstream control channels transmits an NT 'wake up' signal for each cell slot. This 'wake up' signal is essentially the address of the destination NT (or NTs in the case of multi-cast connections). The flaming pattern between cells will be chosen such that it allows rapid clock recovery/run in and delineation of the next cell start.

Upstream

The upstream direction is more difficult than the downstream since there are a number of NTs, all of which need to transmit cells without colliding with other NTs. The NTs will receive timing from the downstream control link and will synchronise themselves to this timing. During the ranging process the loop delay on the link will be measured. The NTs will operate logically all at the same synchronised time. When transmitting they will put the output link through a delay element which is shortest for long links and highest for short links so that all cells will arrive back at the head end at the same time for a given cell slot window. The delay they use should be twice the maximum ranging loop delay (about 200 microseconds) minus the measured loop delay.

The cells will need a run pattern for clock recovery and delineation of the cell start. The identity of the transmitting NT will also be sent in order to check that the correct NT has responded together with a check code to detect errors in transmission. The decision as to of which NT may transmit is governed by the head end.

The downstream control information on the front of cells will broadcast to all NTs the identity of the NT which each cell slot upstream has been allocated to. This allocation has to work in advance of the cell slots to allow for the worst case transmission delay. In order to cater for variable rate data the NTs are able to request slots on the upstream control link. Periodic access is made available on the control channel to each NT for this purpose. The NTs provide the quantity and priority of cells slots that they can use in the next batch of upstream cell slots. The head can allocate fixed upstream cell slots for periodic synchronous traffic if necessary to minimise delays for this form of traffic and can thus operate with same delays as outlined above for the transport of SDH tributaries. Note that these delays appear to be considerably better than TPON for carrying this form of traffic.

It is unlikely to be necessary or desirable to perform upstream power control. Highly sophisticated modulation techniques are unlikely to be necessary upstream as upstream capacity will not be overloaded. It is probable that a coding such as Quadrature Phase Shift Keying (QPSK) would be appropriate for the upstream direction, since it provides very rapid clock recovery and is not very sensitive to amplitude differences. It may turn out in an installation that both the upstream and downstream directions use the same bandwidth but carry considerably different capacities.

CONTROL

Figure 5:
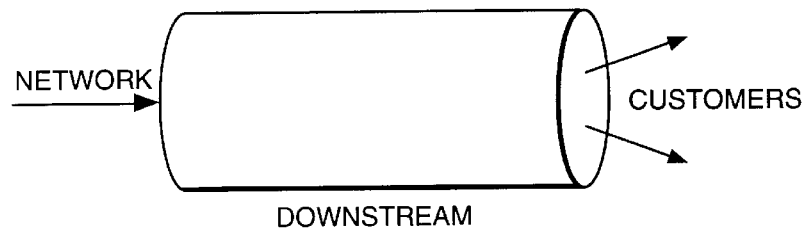
FIG. 5 shows the format of the information in both downstream and upstream cells.

As shown in FIG. 5 the control information downstream is carried in front of each cell, upstream separate small slots are used to carry control and POTS. Unlike ATM the control runs in a synchronous manner with pre-allocated slots to NTs on the upstream control. Both directions of transfer are linked into the cell slot opportunities on the ATM pipes.

In all cases it is assumed that a 16 bit guard band is sufficient to allow for ranging drift and an 8 bit preamble allows a good definition of the timing.

Control Stream Coding

Upstream

The upstream control stream cycles every 250 microseconds. Each of the 32 NTs has a small control slot on this stream of 64 bits.

A check code is essential, this must cover the data and the identity of the NT, the NTs identity itself need not be transmitted and an 8 bit CRC would be sufficient.

The control slot also has 32 bits that are sufficient to carry 2 B with negligible added delay. This is explained in more detail below.

To allow for cell slot requests, 16 bits are sufficient to allow for two classes if necessary. The simplest coding is as shown in FIG. 6.

Downstream

It is important to send framing and notify the NTs which NT is to send each upstream cell. As shown in FIG. 8 this can be achieved by a field on the front of each cell. There are three cells downstream for every one cell upstream. This control field is used in one cell for framing, in another to notify which NT to send a cell, and in the third cell it is reserved for use with higher rate upstream channels.

Initialisation

Figure 9:
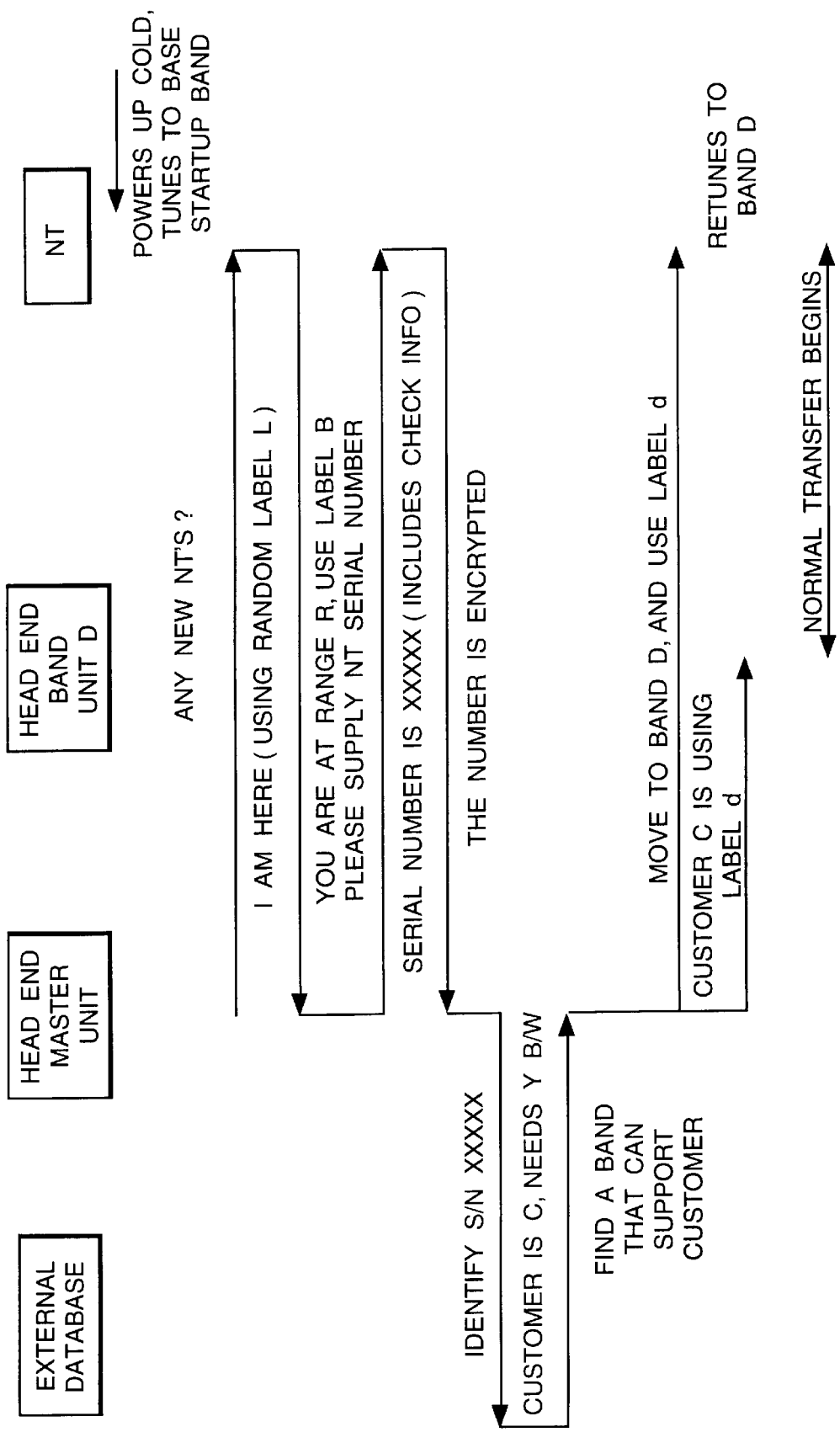

FIG. 9 shows the sequence which illustrates how an NT will be started up at 'power on'.

When the NT 'wakes up' it tunes to the base management band and waits for the head end to ask if any new NTs have powered up. When the NT receives the "Are there any new NTs" it will respond with a particular data pattern and some random label. The pattern is used by the Head end to check the ranging and to check for a clash. If there is a clash it does nothing. If the NT does not get a response it backs off for a random period.

When the Head end gets the "I am here" message it works out the range of the NT and responds with the range information, a permanent label (timeslot) to use on the management band and asks the NT for its serial number.

When the NT provides the serial number (embedded with lots of check information) the head end sends this to an external database. This identifies the customer from the NTs serial number and also their capabilities and bandwidths. Once the NT identity has been found, the Head end can assign the NT to a band, and give it a new label (timeslot). It instructs the NT to retune to a particular band and notifies the Band Unit that the timeslot is now in use.

The Head end can also inform the database or management system of the distance to the NT, this may raise reports if it finds an NT at a significantly different distance from that expected and the NT can then operate normally.

Normal Cell Transfer

Downstream

The cells are sent on the downstream link. The NT looks at the VPI field shown in FIG. 10 in the cell header to decide if it wants the cell.

Upstream

Figures 10, 11:
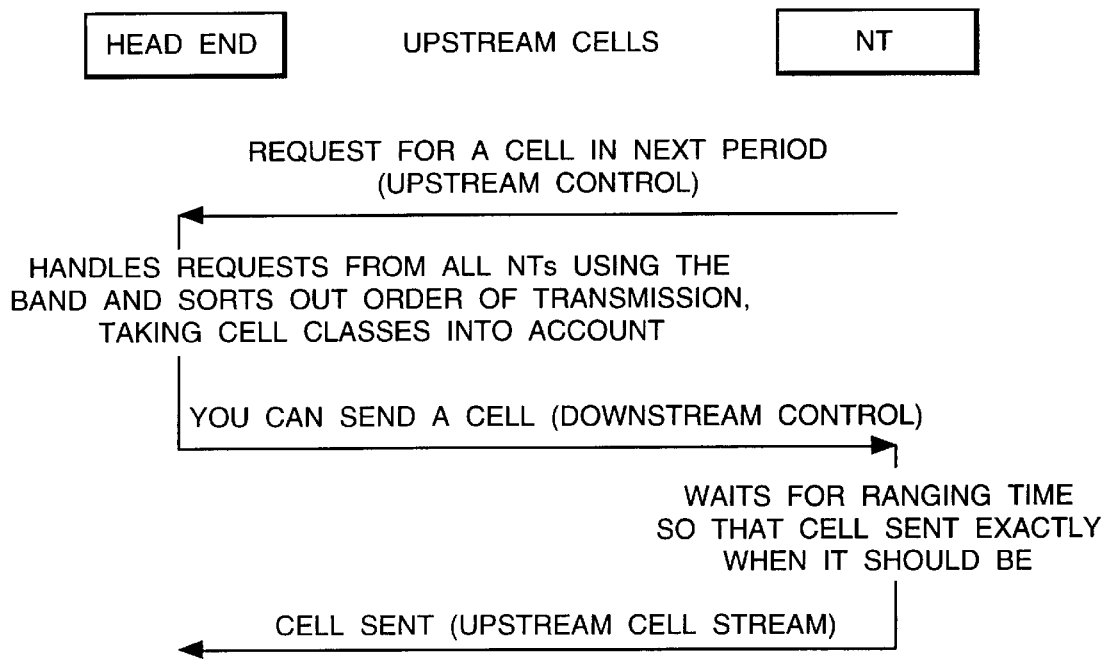
FIG. 10 illustrates the contents and interpretation of a VPI field on a downstream link.
FIG. 11 illustrates the procedure for handling a request from a network termination to send a cell into the network.

To send a cell up into the network as shown in FIG. 11, the NT will wait for its slot on the upstream control and then request a cell in the next period. The head end orders the requests and notifies the NT when it can send a cell. It is possible to support multiple classes of traffic, with the NT requesting a number of slots of more than one class.

Broadcast Channels

Broadcast channels will be transmitted once on the band, though it may be transmitted on many different bands. The NT will pick up those channels it wants from that VPI field. The NT needs to be told to select the given channel and send it to the customer, this may involve a VPI/VCI translation.

When the customer requests connection to a broadcast channel, the customers request will be actioned at the head end, (as well as possibly in call handling to establish the presence of the channel at the head end and for charging/ statistics) the head end will then inform the NT to select the VPI value and pass it on.

Head End Sequencing of Upstream Cells

There are two classes of cells, those with low delay requirements and the rest. NTs can ask for cells of each type.

The Head end can simply keep a First In/First Out File (FIFO) of requests of high priority cells and if there are any high priority cells queued then it will send these requests first. If there are no high priority requests there are a number of strategies for handling low priority cells, it could again have a FIFO and handle each NT in turn for up to 32 low priority cells or it could handle the NTs in a round robin taking one from each. It is suspected that the round robin is fairer and may be simpler as well.

REALISATION

The Network Termination

The NT could be designed to fit within a standard phone socket. The functionality is almost entirely contained within a single ASIC. The only additional components would be a pin-diode and laser to link to the fibres and a minimal power supply to power the ASIC and to provide power and ringing to the telephone, the NT might require more Random Access Memory (RAM) than can simply be provided on chip, if this is so then additional RAM can be fitted.

Figure 12:
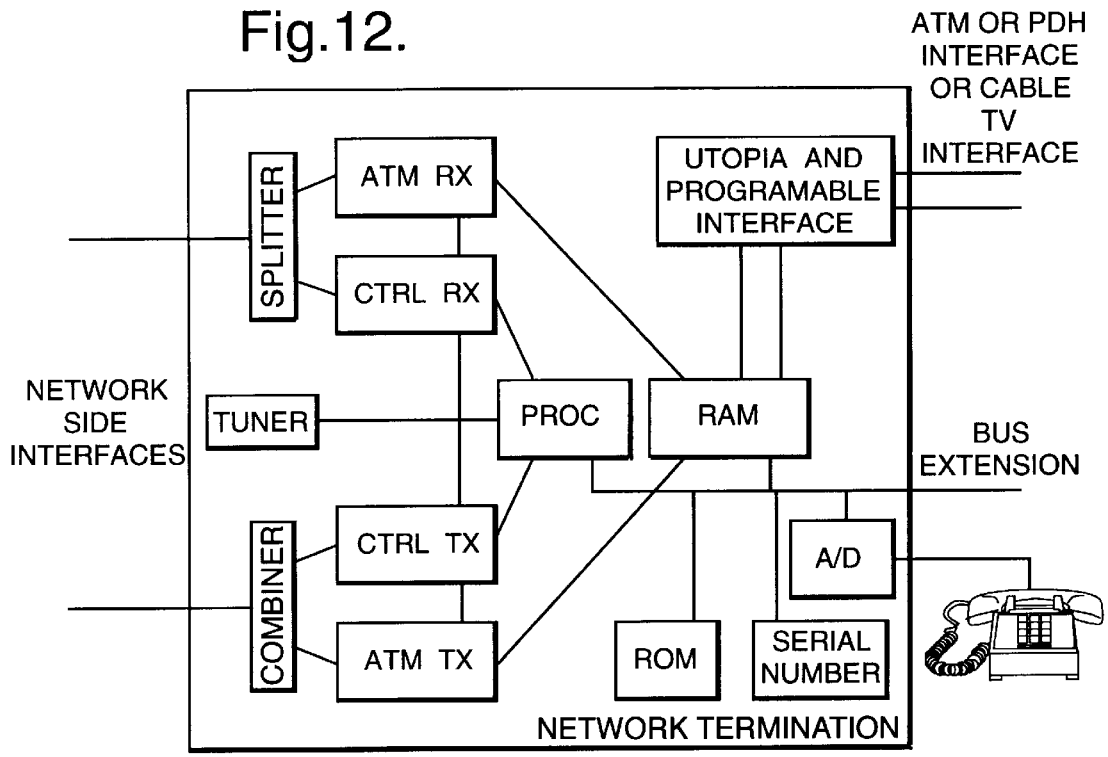
FIG. 12 is a block diagram of a network termination.

FIG. 12 shows a logical block diagram of the NT (probably one ASIC). The receive side receives the ATM and the control through a tuner. The control and preamble allows the NT to control the transmit side and 'wakes up' the receive side of the ATM, this can look at the VPI field and decide if it wants the cell, if not the NT can go to sleep until the next cell. When there is a cell it wants it inserts the cell into the NTs RAM by Direct Memory Access (DMA).

The processor when examining incoming cells does any necessary translation (for broadcast cells) and descrambling and processes them. This processing can vary according to the type of interface.

For an ATM interface the cells are simply queued.

For a 2 Mbit/s interface the cells have the appropriate ATM Adaption Layer (AAL) processing performed.

The interface may be programmed to behave in a number of different ways to support different configurations, this is covered in more detail in a later section.

The low power Advanced RISC Machine (ARM) processors has a small ROM, a RAM for cells and data, and can access the unique serial number when required. The processor bus is taken off chip, to allow additional memory and buffering for users sending lots of bursty data traffic.

In the Transmit direction the outgoing cell sender DMAs the cells from memory as necessary and transmits the upstream control information that has been setup by the processor. This also has range and power control so that the control and cell information is sent at the right time.

The processor also acts as a Distributed Signal Processor (DSP) for handling the POTS telephone connected directly to the NT. This is supported through an integral Analog/Digital (A/D) converter.

The Tuner is controlled by the processor to tune the NT into a particular band. It will boot up into the lowest start band, and then when required move to a higher traffic carrying band when the start-up protocol has been negotiated.

Power—The NT can be powered locally or via a copper pair. A battery backup is required if it uses local power.

The Head End

Figure 13:
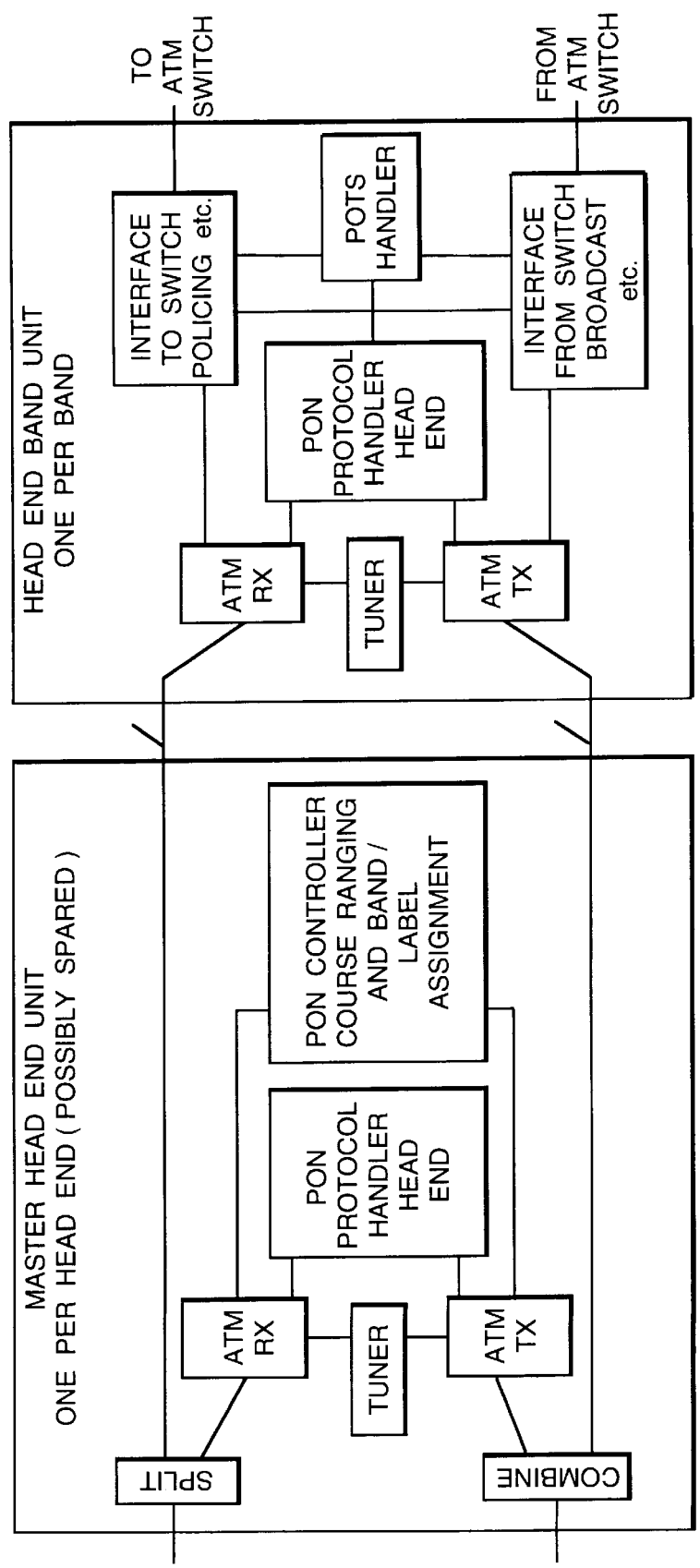
FIG. 13 is a block diagram of a head end unit.

The Head End can support a vast number of customers. There are two parts as shown in FIG. 13: the master unit and a variable number of band units. The master unit handles the start-up of NTs and the general configuration and management of the customers. This has splitter/combiners to support the connected band units. The Band units operate on one band each handling the ATM protocol and interfacing to the ATM switch. These also have a function to aggregate the POTS traffic and bundle it up as 2M bearers to send to a switching system as appropriate.

A head end unit could consist of a worker/standby pair of Master Units and a number of band units. It is expected that say 4 band units could be on one card and could be simply 1 in N spared.

Given that each band can support up to 32 customers, then a configuration of 2 Master units and 8 Band cards could support 1024 customers on the fibre.

The Master unit controls the link and splits/combines to the band units. It could also provide an interface for an Optical Time Domain Reflectometer (OTDR) for testing purposes. The OTDR could operate at the same time as traffic was being carried by operating on a different wavelength.

The band units could interface directly with an ATM switch, or be connected to SDH transmission to back haul it to another site. Each band would correspond to a 155M port on the switch.

Technical Issues

Ranging and Power Control

When the NT is turned on, it tunes to the management start-up band and awaits for an opportunity for a new NT to respond. When it can, it responds to the Head end. Assuming that there is not a clash the head end will respond to the NT and give the NT its initial range. Later when the NT is in normal use the head end tracks where in the guard band the NT responds. This band has limits and if the NT repeatably is operating at a limit, the Head end can send new ranging instructions to the NT. As the line can slowly drift, the NT must be routinely ranged occasionally to catch any drift. This can be performed on top of a checking cell sent periodically to ensure the NT is working.

The NTs will have to be built to a limit of range variation, e.g. 20 km. The larger the value of this range variation the longer it has to delay each instruction from the head end, and hence the more complicated it becomes. To give 20 km of range, the head end would be sending instructions to the NTs 26 cells in advance of it getting the reply. (20 km=100 $\mu$s=~13 cells, loop=26 cells).

The system could be set up to operate with a longer range, provided the variation in range was less than the NTs have been built to support by adding a fixed offset at the head end. There would be a corresponding increase in delay for such a system. The System could also operate power control if required.

Timing and Framing

Downstream needs to carry about 150M of ATM, it is also desirable to operate at simple factor for the 32 NTs and to give an integral number of cells per frame. This number is 48 cells, which would operate at 163M. The actual data rate has to be slightly higher to allow for control, timing premables, check codes and the guard band. The formula is:

$$\text{Data Rate}=(\text{Cell\_size}+\text{Control}+\text{Preamble}+\text{Guard\_band}+\text{Check\_code})*\text{Cells\_per\_frame}$$

$$*\text{Frames\_per\_Second}$$

If the guard band is assumed to be 16 bits and the preamble 8 bits, this gives:

$$\text{Data Rate}=(53*8+8+8+16+16)*48*8000=181.248M$$

It may be desirable to operate faster to give a simple relationship between this time and 155.52M SDH rates and to the upstream requirements. This data rate can be considered as a minimum data rate. The upstream is more complicated as it has to handle two slots and becomes:

Data Rate=(Cell_slot+Control_slot)*Cells_per_frame*Frames_per_second

=((Cell_size+Preamble+Guard_band+Check_code)+(Control+pots+Preamble+Guard-band+Check_code))*Cells_per_frame*Frames_per_second

=((53*8+8+16+16)+(16+32+8+16+8))*16*8000=69.632M

It may be worth operating the downstream slightly faster at 208.896M=(3×69.632M) with a larger guard band to make upstream clock generation easier.

The Preamble is used to determine the exact timing of the data and to correctly identify the start of the cell. The Guard_Band is to allow for non-exact ranging and some drift. The Check_code is to check for bit errors and data corruption due to a faulty NT in the upstream Failure Detection and Handling The streams will have a check code added to them so that bit errors and corruptions/collisions on the upstream ATM can be detected. When the head end sends a cell it sends a Cyclic Redundancy Code (CRC) at the end (probably 16 bits) which can be checked by the NT to look for errors.

When an NT sends a cell it runs the CRC over the cell, the control and the NTs identity, this helps check for bit errors and for corruption if the ranging fails.

Once a fault has been identified, the head end can positively test each NT with a test cell, if an NT is faulty it can be reported for maintenance and the head end will try to reset it. If this is successful the NT will resume operation, if not and the NT is corrupting the band, the working NTs can be told to retune to a spare band leaving the faulty NT.

MANAGEMENT ASPECTS

The NT is simple and does not need any configuration by a maintenance man. It does not have to be configured to a particular band or have anything set up.

The customer is uniquely identified by comparing the serial number of the NT (complete with a lot of check information) with a database of customers. As a result of this the customer can be configured to a band that has an appropriate load on it. Should the customer change his load and need to share the band with less customers, then this is simply performed by instructing the NT to tune to a new band and use a new label in a very similar way to the start-up sequence.

The NT has automatic ranging. When it powers on it performs ranging using the maintenance band in a way that does not affect normal live traffic. Once the range has been established, the head end monitors the appearance of the NT and if it drfits towards one end of the guard band it instructs the NT to change its ranging parameters appropriately.

Once the NT has been installed, all that is necessary is to setup on the database the record of the serial number and the customer and then no man intervention is needed.

Automatic reconfiguration (i.e. with no physical intervention) around faulty band cards is possible.

Provision must be made for the downloading of programs to configure the NT. The Read Only Memory (ROM) based code within the NT would be sufficient to communicate with the head end, but would not include any service specific coding of the customers interface.

APPLICATIONS

Telephony (POTS)

To make the system more efficient for carrying simple POTS, there are some special features.

In the downstream direction, a cell is used to carry the 47 timeslots of 2M streams, and the NTs look at these cells and select the octets that are for them, thus there is no added packetisation delay in sending this data to line.

In the upstream direction, there is capacity within the control stream for each NT to send 2×64K channels embedded in the stream, such that these do not consume any of the 50M bandwidth of the ATM pipe. This reserves the ATM capacity for other services that actually need it. The upstream delay for this is at most 250 $\mu$seconds, again there is no packetisation delay.

N×64K services

A Private Branch Exchange (PBX) that supports many lines could send whole 2M services over AAL1 in ATM cells and need not worry about delay.

Likewise for multiple N×64k cases it is possible to sub-load the cells where the delay penalty cannot be borne. If a cell carries 8 frames worth of 64 k then it can handle 6 timeslots or 384 kbit/s as a single entity. In the return direction the timeslots can be taken off the cells used for carrying POTS and so these have very low delay. The loop delay would thus be about 1 millisecond.

Data Traffic

The NT would have to perform some buffering of traffic, but it does not have much buffering capability if it relies on the relatively small amount of memory which can be provided within the ASIC. If it is unable to force the terminals to buffer then it will need additional memory.

Carrying SDH

The PON could also be used to carry SDH Tributaries using the capacity at regular fixed periods over a multiframe.

Large Customers

The system is primarily to support customers sharing the capacity of a band between the group. However with a different NT it would be possible to supply a large customer with a complete band. As the band is dedicated to the single customer it can operate bidirectionally to carry a full 155M both ways.

As a further option, a band could be used to carry about 108M upstream (2 cells up per 3 down), using essentially the same mechanism.

PON Networks

This is designed to work in shared PON mediums. The fibres can be split either actively or passively to feed 1000+ customers. Each band can support up to 32 customers, and there can be as many bands as the technology in the tuners can handle.

Cable TV Networks

The system would work for a cable TV network as well as for the PON case. The bandwidth available within a band may have to be reduced, but the same principles would work.

NT INTERFACES IN THE HOME

A likely partitioning of functionality of the NT into core internal NT functions and additional bolt-on functions is discussed below. Final products could optimise or reduce these interfaces according to the marketing requirements and the need for producing a single box product.

Direct Functions

Functions which could be provided directly in the NT:
POTS 1.5 or 2 Mbit/s PDH

ATM at 51 Mb/s or 2 Mb/s
N×64 Kbit/s/s
Motion Picture Expert Group (MPEG) transport stream In addition to the POTS interface provided directly by the NT processor, several customer specific interfaces would be possible on the NT.

More complex functions would need to be accommodated by extending the "UTOPIA" functions. The basic interfaces here would be either an ATM interface at e.g. 51 Mb/s or multiples of 25.6 Mb/s or 2 Mb/s. Alternatively a standard 1.5 or 2 Mbit/s/s PDH interface could be provided by implementing ALL Type 1 in the programmable interface.

It would also be possible to provide an MPEG transport stream in the UTOPIA device by providing the necessary AAL functionality.

Additional Functions Available with Plug-in Modules

Further extensions of the UTOPIA interface capability could provide additional functions by means of small plug in units to a standard extension interface from the UTOPIA function. The standard extension interface would be an ATM extendible bus.

Plug in modules could include:
MPEG TV decoder or a video-on-demand set-top box connector
Integrated Services Digital Network (ISDN) primary or basic rate connector
Local Area Network (LAN) capability
Simple Private Branch Exchange (PBX)/Intelligent telephone functions For example, an MPEG TV interface could be provided to connect TV services. This would require a small add on box which would provide a connection to a TV. It is likely that this box would also support satellite connections. The interface out of the UTOPIA processor to the box would be MPEG2 transported over either an ATM (e.g, 51 Mb/s or 25.6 Mb/s) or Plesiochronous Digital Hierarchy (PDH), e.g. an MPEG interface. It would be possible to use the latter ATM format interface to feed directly a set-top box with control and video streams.

ISDN primary or basic rate terminations could also be provided by a small add-on box providing the standard interfaces.

With a little more development it would also be possible to provide for Local Area Network (LAN) or Frame Relay terminations, but it is most likely that existing router etc equipment would be used to provide this LAN to ATM function.

FUTURE ENHANCEMENTS

This architecture can evolve to take advantage of higher data rates and advances in ASIC technology.

New NTs/Head Ends can be developed that operate at higher data rates, on higher frequency bands. These can be used alongside and on the same PON as the earlier units operating at lower data rates.

The processor in the NT gives a capability to provide a range of different interfaces.

If and when tuneable Wave Division Multiplex (WDM) becomes available at an affordable price, this could be incorporated into the NT and Head end units.

SECURITY AND PRIVACY

The embedded serial number allows the provisions of considerable security and privacy.

Each NT will have a unique serial number burnt into it as part of the manufacturing process. This will include considerable check bits and redundancy. The customer can be uniquely identified by the access network interrogating a database to identify the customer and their requirements. This can then be used to control the delivery of encryption keys.

The NT could provide the encryption/decryption as requested. For POTS the encryption would be on an individual timeslot. For broadcast channels the encryption would be on a per channel basis, and for point to point traffic it would be across all Virtual Paths (VPs) going to the customer.

What follows is an example of how this can be made very secure, other methods could also be adopted.

The encryption software can be downloaded to the NT.

Using the serial number (or part of the serial number) as the key the NT is provided with two main keys. One is used for point to point traffic and the other for broadcast traffic. The point to point key is used with the encryption algorithm to handle all point to point and POTS traffic. The broadcast key is used to provide a secure channel for the provision of individual keys for individual channels. This is separate from the point to point key as it could be subject to more intelligent attack with as more of the data is known, thus reducing the potential privacy loss on the point to point channels. Both keys may from time to time be updated.

Start-up of system

The Head end passes two encryption keys to the NT using part of the NTs serial number as protection for this data. One key is used for all point to point traffic (including POTS) the other for the control of broadcast channels.

Point to Point traffic

All cells are encoded using the NTs point to point encryption this is for both upstream and downstream.

Broadcast Traffic

Figure 14:
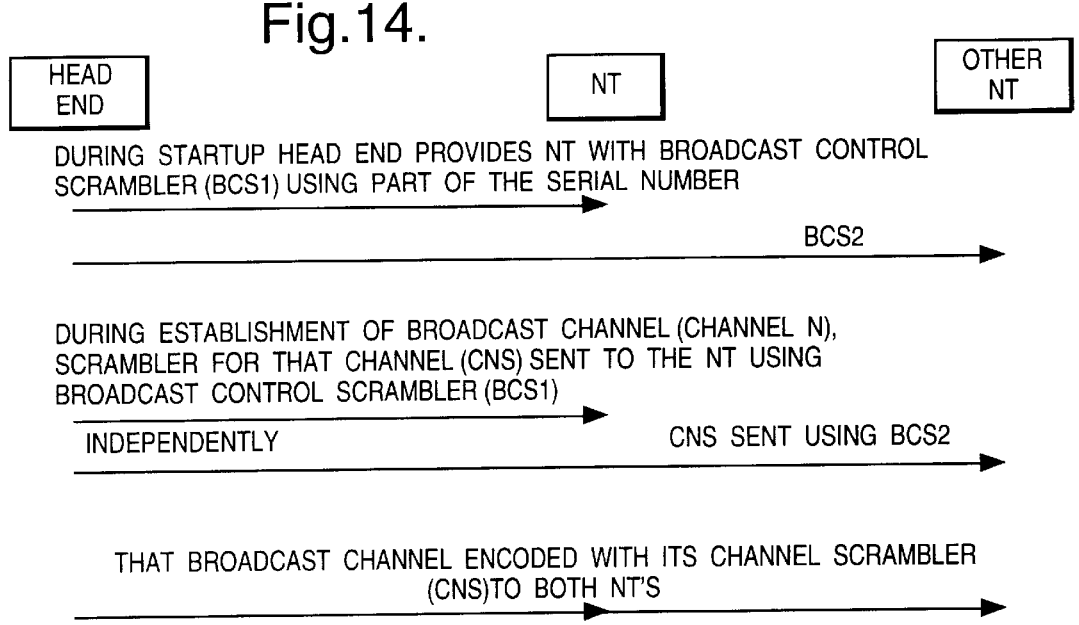
FIG. 14 illustrates the procedure for use of a scrambler for broadcast traffic.

This is the most complex case as each broadcast channel has to have its own encryption. As the encryption is common across all customers wanting the channel, this protocol is easier to break as some of its contents are known. To prevent this being a weak point in the point to point traffic, a different encryption key is used to control them as shown in FIG. 14.

POTS Traffic

POTS traffic is encoded on an Octet by Octet basis using the NTs point to point scrambler.

The NTs will now be considered further:

NT DEPLOYMENT ARCHITECTURES

The NT can be deployed in a number of different configurations. FIGS. 15A–15F, 16A–16C and 17A–17C illustrate some of the possible configurations.

Figure 15A:
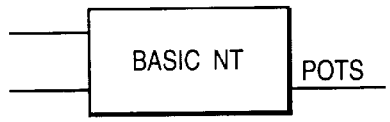
FIGS. 15A–15F illustrate a range of network termination configurations.

FIG. 15A shows the NT in its simplest configuration, supporting a single POTS line as in the current phone sockets. This can be upgraded by plugging in a single interface adapter, or a serial ATM interface.

Figure 15B:
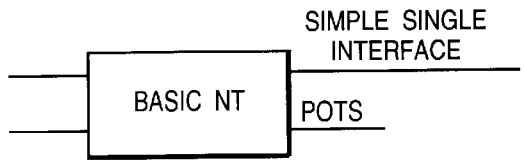

FIG. 15B shows an NT for a simple domestic customer. It supports a single POTS line and an interface adapter. This can be upgraded by using a larger NT box to support many NTs, or by using a Serial ATM interface to other TA's around the premises.

Figure 15C:
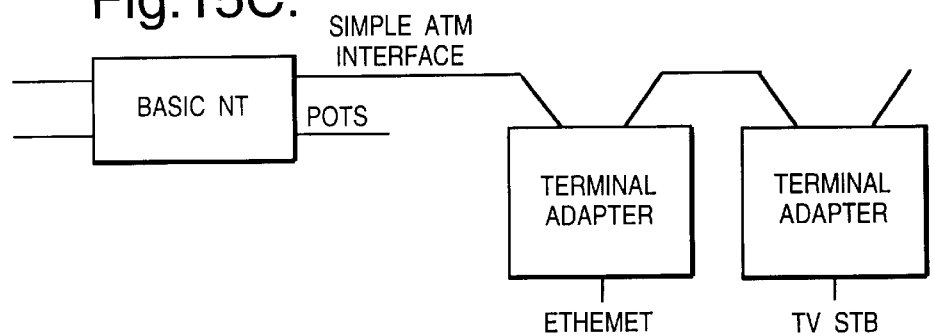

FIG. 15C shows how a simple NT supports a serial ATM interface which is connected to a number of Terminal adapters around the premises.

Figure 15D:
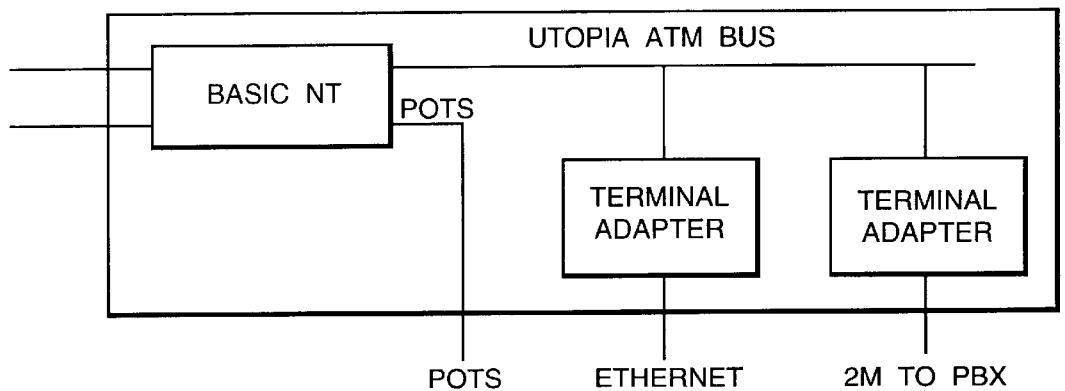

FIG. 15D shows how an NT uses a larger box and supports a number of Terminal Adapters. It can also support a serial ATM interface to other Terminal Adapters around the premises.

Figure 15E:
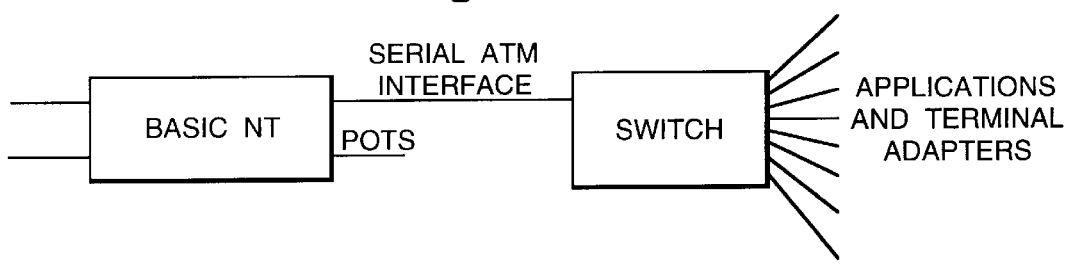

FIG. 15E shows an NT which supports only a serial ATM interface. This interfaces with a PBX or LAN switch and hence with many terminals and terminal adapters.

Figure 15F:
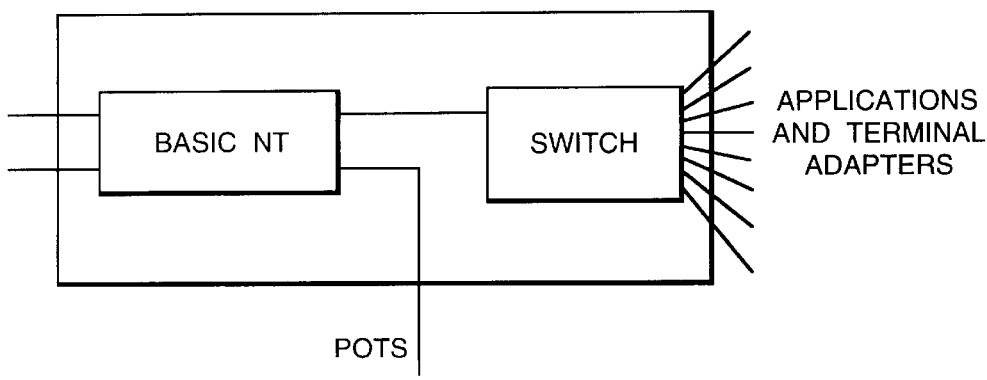

FIG. 15F shows an NT in the same box as the switch. It could use the UTOPIA bus interface rather than the serial interface, if appropriate.

TERMINAL ADAPTER TYPES

Terminal Adapters (TAs) may be built for many purposes. Among the types required are:
Interface a 2M Pulse Code Multiplexer (PCM) for a PBX
Ethernet
Direct feed to a Set top Box (Video on demand and/or broadcast video)
ISDN equipment (2B+D)
Ordinary POTS phones
Video Telephones
Direct interface to computers
Cameras for security and other purposes
Musical Instrument Digital Interface (MIDI) sound interfaces
Telemetry for water/electricity/Gas meters

POSSIBLE PHYSICAL CONSTRUCTION

FIGS. 16A–16C and 17A–17C show how the NT could be provided. The NT starts as a small box with one additional interface, but can grow.

Figure 16A:
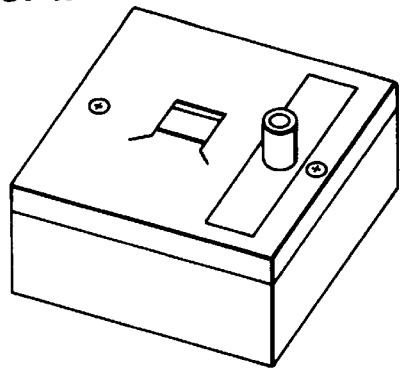
FIGS. 16A–16C shows various views of a proposed basic network termination unit.
Figure 16B:
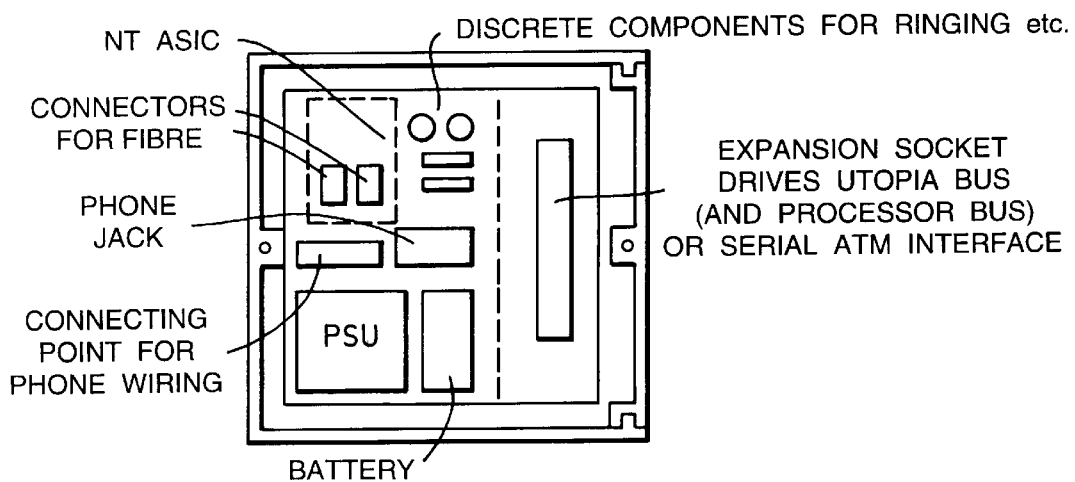
Figure 16C:
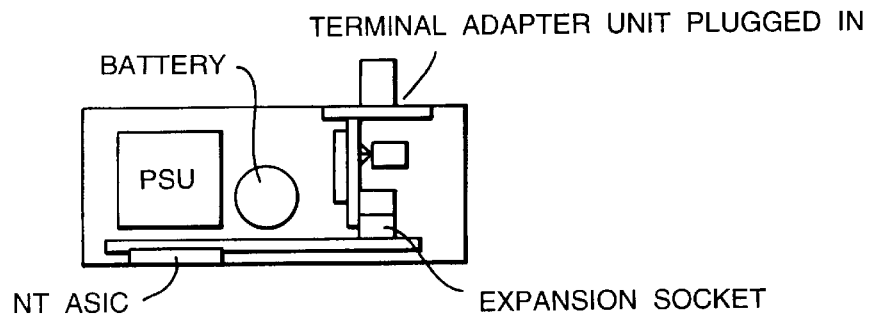

FIGS. 16A–16C show various views of a basic NT. It has a small Power Supply Unit (PSU) running from an appropriate power source, a battery (if appropriate) to support the POTS phone in the event of power failure, and a single expansion unit. It has a standard phone socket and a wiring point for extension phones on the standard line and thus it can be used in exactly the same way as the existing phone socket. The NTs ASIC may be on the underside of the printed circuit board if appropriate. This unit can support a serial ATM interface or a single terminal adapter.

Figure 17A:
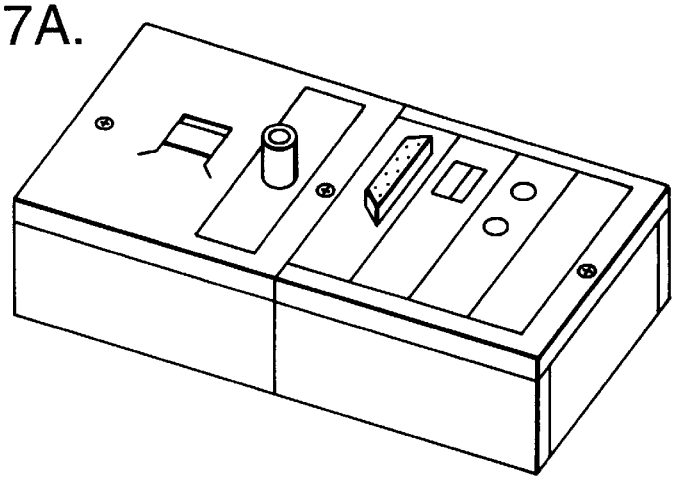
FIGS. 17A–17C show various views of a proposed expanded network termination unit.
Figure 17B:
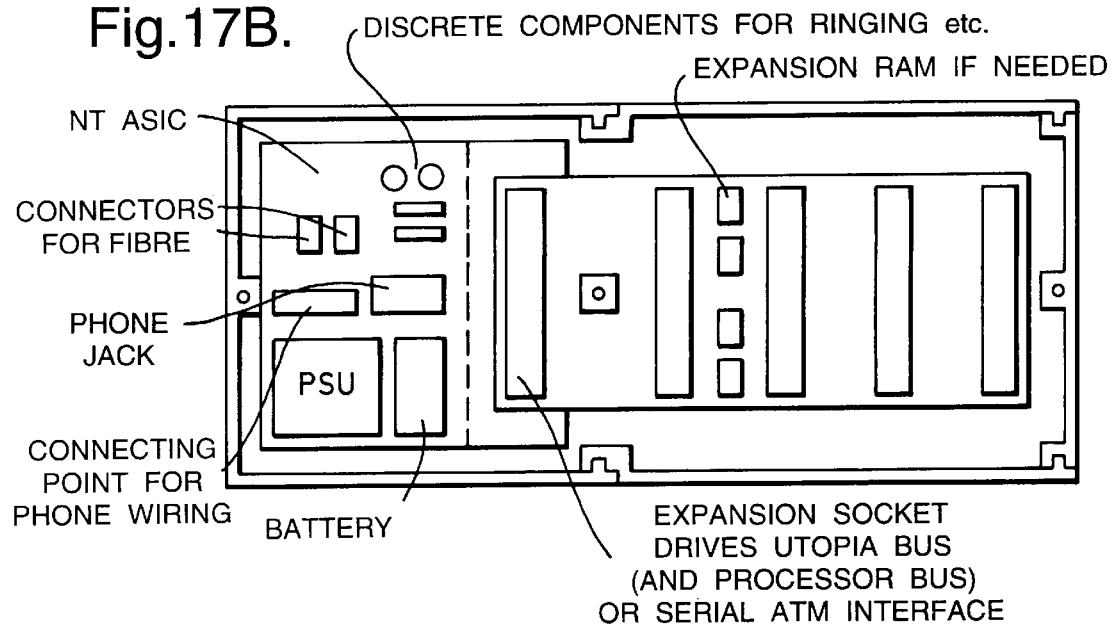
Figure 17C:
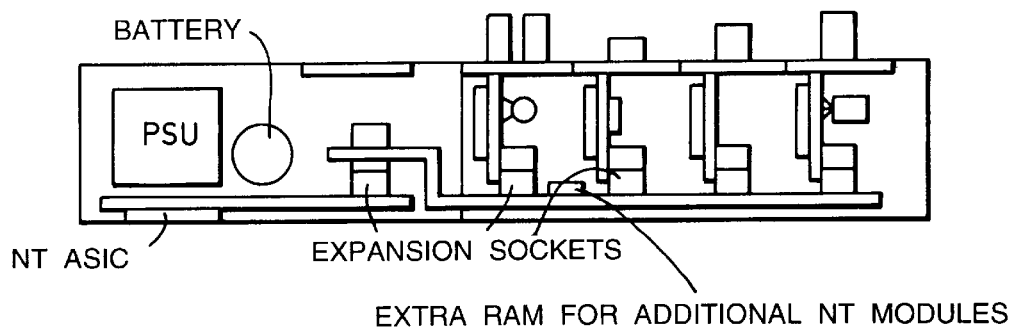

FIGS. 17A–17C show various views of an expanded NT. An expansion backplane has been added with additional RAM to support multiple TA's. This unit may require a larger PSU.

NT INTERNAL DETAIL

Referring back to FIG. 12, a description of the elements follows:

ATM RX

This receives cells and DMAs them into the RAM (32 bit wide) when the receiver circuit (RX) control enables it to read a cell. As soon as it has read a cell, it interrupts the processor to find it a new location to store the cell. This also passes the received clock, divided by three, to the ATM transmitter circuit (TX) for use as a transmit clock.

Control RX

This handles the control and VPI at the start of each cell. It is responsible for most of the sequencing of events, as it controls the framing and TX sides. In front of each cell there is an 8 bit control field, this is used to provide framing and to control the upstream ATM.

Handling of control field

Figure 18:
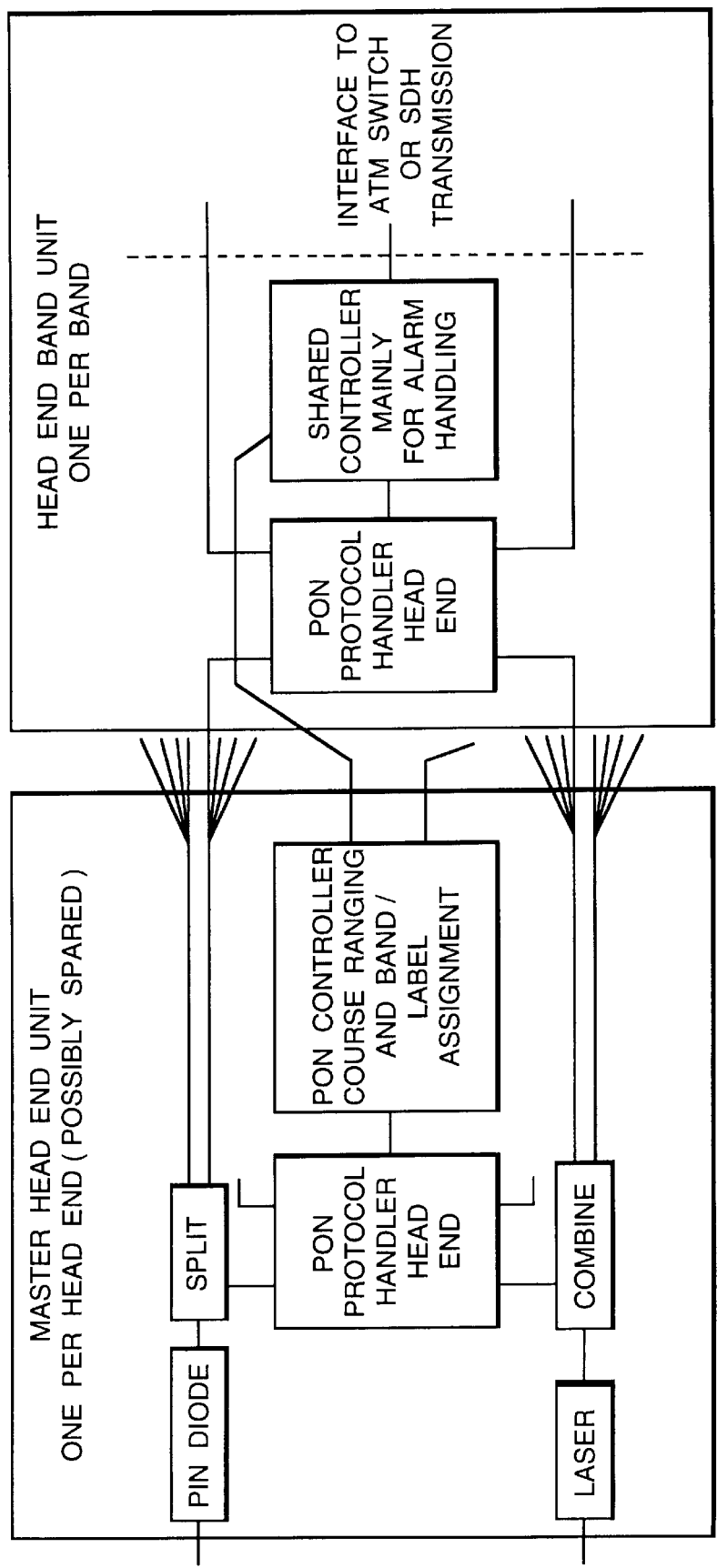
FIG. 18 shows a block diagram of head end units.

It is important to send framing and notify the NTs which NT is to send each upstream cell. This can be achieved by a field on the front of each cell as shown in FIG. 18. As noted earlier there are three cells downstream for every one cell upstream and this control field is used in one cell for framing, in another cell to notify what NT to send a cell, and in the third cell is unused.

Handling of VPI field

The cells are sent on the downstream link. The NT looks at the VPI in the cell header (see FIG. 10) to decide if it wants the cell.

The internal NT control has different messages some of which will be not be scrambled, some using the normal Point: Point scrambler some using the special Point: Multipoint control scrambler and some using part of the NTs serial number.

The NT selects the following cells:
The Control to all
The POTS cells it needs
The Internal control to itself
The broadcast channels it needs
Its own Point to Point traffic
Sub Carrier Tuner This tunes the sub carrier receivers and transmitters into the band. In a fibre system it can be the same frequency for both directions. This may not be achievable on coax, which is being used for both directions of transmission at once.
Control TX When instructed to by the control RX this transmits a 56 bit block of data assembled by the processor. The processor will update this block if it wants to, otherwise it is repeatably transmitted once every 250 μs when told to by the Control RX.

ATM TX

This will transmit an ATM cell when instructed by the RX control. It will send an 8 bit preamble, then the cell DMA'd from the RAM and finally a 16 bit check code. The preamble and check code may be part of the data when in the RAM. When the cell has been transmitted it will interrupt the processor to setup for the next cell.

Processor

Embedded within the NT is a processor. This should be a 32 bit RISC processor. The very low power, small size and fast ARM processor is the most suitable as it already exists with much of the additional circuitry needed for this unit. The processor's functions are explained in the next section.

One commercially available chip has a CRC generator built in, using the top address bit so that CRCs can be generated or checked simply by accessing the data. This capability would help in checking cells and AAL5 CRCs.

Processor RAM

A block of 32 bit wide RAM is used for program storage, cell storage, and work space. Preferably at least 32K should be provided on chip, with scope for off chip expansion if necessary.

Serial Number

Inside each NT is a unique serial number (scrambled with lots of check information) blown into the NT when it is manufactured. This should be of the order of 256 bits.

Processor ROM

Sufficient ROM needs to be provided to allow the unit to start and communicate with the network. No customer end communication is necessary, just enough to allow the main program to be loaded from the network.

A to D converter

An Analogue to Digital/Digital to Analogue converter is used to interface with a telephone. Suitable external control is also necessary to apply ringing to the line, and detect off hook and loop-disconnect (D) pulses, multi-frequency tones (MF4) would pass through to the exchange.

Programmable interface

This will operate in at least three ways:

A serial 50M ATM interface to directly feed a home ATM LAN.

Multiple 25.6 Mb/s interfaces to directly feed a home ATM LAN.

A parallel UTOPIA style ATM bus for terminal adapters.

NT SOFTWARE

There will be some software in Read Only Memory (ROM) and some downloaded in RAM. The RAM software will consist of code that is always loaded, and optional modules for particular terminal adapters/adaptations. The software should consist of a number of modules allowing the ROM software modules to be updated individually if necessary after the NT has been started up.

ROM boot software

On start-up the NT should perform a basic check, ensure the tuner is set for the start-up band, and setup an initial reply task to identify itself. It then enables the incoming control to look for a new NT enquiry. When it has sent an "I am here" it starts a short time out for a matching range notification. If this runs out it waits for a random time and starts again. On receipt of a "Range Message" it sets up the range time in the control RX (this puts a delay on it enabling the TX control and ATM streams).

After receiving a range message, it sets up a cell (with the NTs serial number) in it as the outgoing cell, and sets up the outgoing control data to request to send 1 cell.

After this it should be capable of handling three cell types:

Downloaded code.

A retune message to move to a particular band.

A reset cell. The NT will force a restart, preferably a hardware reset.

The ROM boot software, need not cover any terminal adapters, the phone, or handle multiple cell priorities.

It may be desirable to include some diagnostic fault finding and test software in the ROM.

Downloaded code

For every NT the following code will be downloaded. It should be capable of replacing any ROM module if necessary, but to utilise this code if appropriate. The software for the terminal adapters should be a number of individual modules that can be downloaded as needed.

Handling of the POTS phone includes handling the A to D converter, applying ringing and handling LD signalling.

Encryption and decryption and the provision of keys and their management.

Handling multiple cell priorities, so that multiple types of traffic can be handled.

Support of the programmable interface.

For each type of terminal adapter there may be more than one type of adaptation program applicable. This can be downloaded to the NT or to the TA itself if appropriate.

HEAD END LOCATION

The head end unit could be in many places, though typically it will directly link with a switch, however it could exist in a stand-alone form linking to Synchronous Transfer Mode (STM)-1 or STM-4 SDH transmission.

Linked to an ATM switch

In this form the head will directly feed a switch, though the cards would have to be different for different switches as they would have to be designed to fit straight on to the appropriate switch core, with appropriate policing, translation and interfaces.

Stand alone deployment

In this environment the head end would convert a standard SDH transmission interface into the PON. This could be connected to any network but would cost more than the previous case.

POSSIBLE LAYOUT

The Head End can support a vast number of customers. There are two parts: the master unit and a variable number of band units.

The system could split and combine the signals electrically or optically. If these are performed optically then optic amplification is probably required after the signals are combined. The example that follows as shown in FIG. 18 is for an electrical combination.

The master unit handles the start-up of NTs and the general configuration and management of the customers. It also houses the laser and receivers. The Band units operate on one band each handling the ATM protocol and interfacing to the ATM switch. These also have a function to aggregate the POTS traffic and bundle it up as 2M bearers to send to a switching system as appropriate.

MAIN HEAD END ASIC

Figure 19:
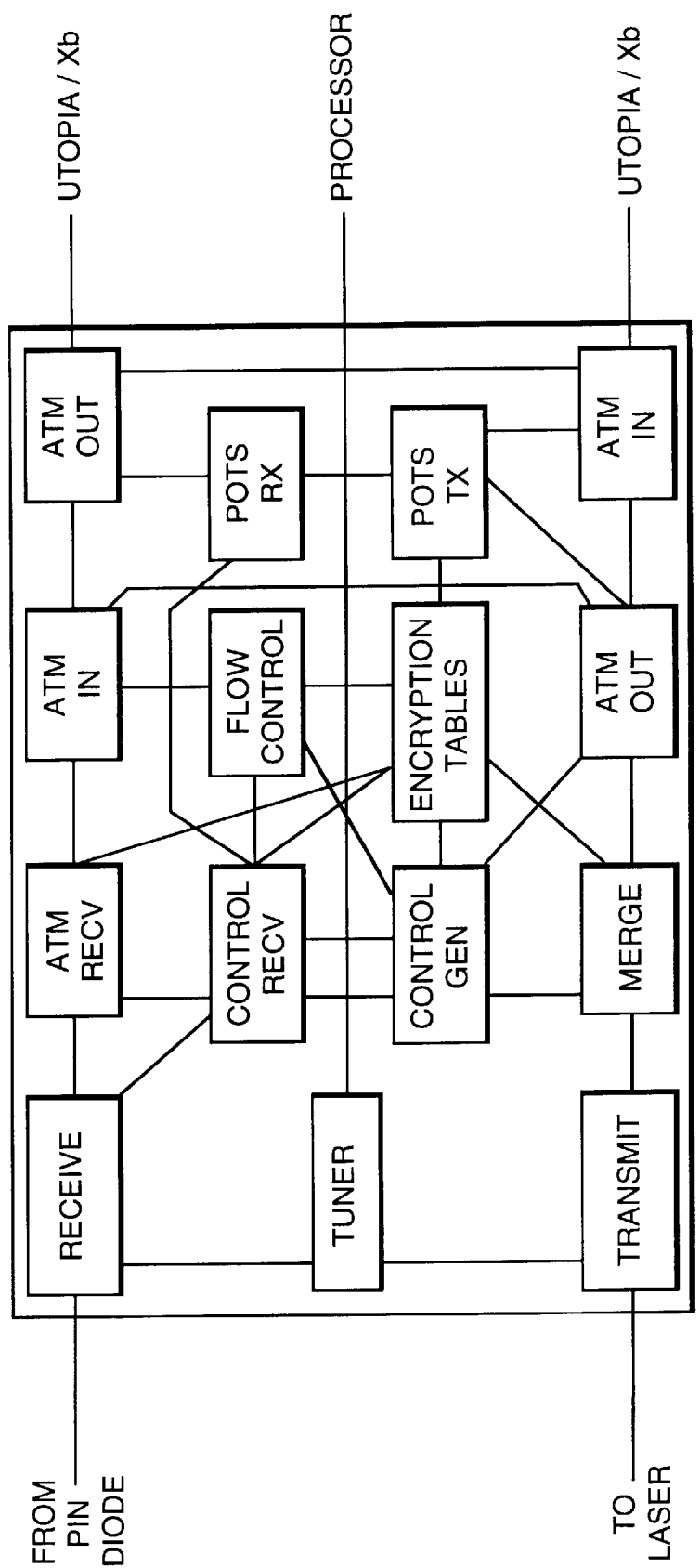
FIG. 19 shows a block diagram for a main head end ASIC.

This is shown in FIG. 19 and drives a laser and a diode at one side for a band, and on the other has an UTOPIA interface to send and receive cells, and a processor bus.

This will be used in each band unit making up the majority of the functionality and on the master unit. The UTOPIA interface will not be used on the master unit, all of its cells coming from the processor bus.

Transmit Side

ATM in.

This receives cells from the UTOPIA interface, and filters off POTS cells and cells to send to the processor.

ATM out.

This has a short FIFO queue of cells, cells come from the ATM in, the POTS TX processing and from the processor. The cells header is sent to the control generator, to allow it to send the cell notification ahead of the cell, and it is used to obtain scrambling information.

POTS TX.

This handles and reorders data from POTS streams, and scrambles them. The interface across the network has up to 3×2M PCMs to a 64 k switch (this is carried in cells using AAL1). These are then mapped into up to two cell streams to the NTs, where an NT always looks at the same octet of each cell. Each octet is scrambled individually. See below for more detailed description of this function.

Merge.

This sends the control followed by the cell scrambled with the appropriate code and finishes off with a check code.

Transmit.

This loads the outgoing signal on to the appropriate sub carrier.

Encryption Tables.

These hold two encryption keys per NT, one for normal control and one for broadcast channel control (total of 64) and one per broadcast channel.

Control Generation.

This sends the cell notification ahead of a cell (by examining the head of the Cell FIFO, this information is used to look up the decryption key appropriate for the cell). It also sends the flow control information when instructed from the flow control.

Receive Side
Receive.

This extracts the data from the sub carrier, delivering the data to ATM receiver to handle cells and the control receiver to handle the small control slots.

ATM Receive.

This gets incoming cells. It checks their framing and check code, and decrypts them if valid. It also monitors the cells position in the guard window. If this drifts to one end of the guard band and persists it notifies the processor. The processor will send a cell to that NT to readjust its timing.

ATM In.

When a cell has been received, it may be sent to the processor or to the ATM out queue.

ATM Out.

This holds a short FIFO of cells from the PON, from the POTS RX processing and from the processor. These are sent across the UTOPIA interface as required.

POTS RX.

This takes the POTS information from the control steams and converts it into the corresponding 3×2M PCMs carried over AAL1 to a 64 k switch. See below for a more detailed description of this function.

Control Receive.

This handles the incoming control stream. It checks the data and sends the POTS to the POTS processor and the cell requests to the flow control. It also checks the timing of the response. As a special for the master unit it can perform the "Any New NTs" protocol, returning to the processor the returned data from the NT and when it occurred. It also looks for drift of the data with respect to its guard band.

Flow Control.

This handles the pending cell requests from NTs, sending the instructions to the outgoing control for which NT is to send a cell and then giving this detail after the appropriate delay to the ATM receiver to recognise the cell. It is also capable of sending out the "Any New NTs" command from the processor, when it does this it starts a timer in the Control receive to measure the cell position. See below for a more detailed description of this function.

Figure 7:
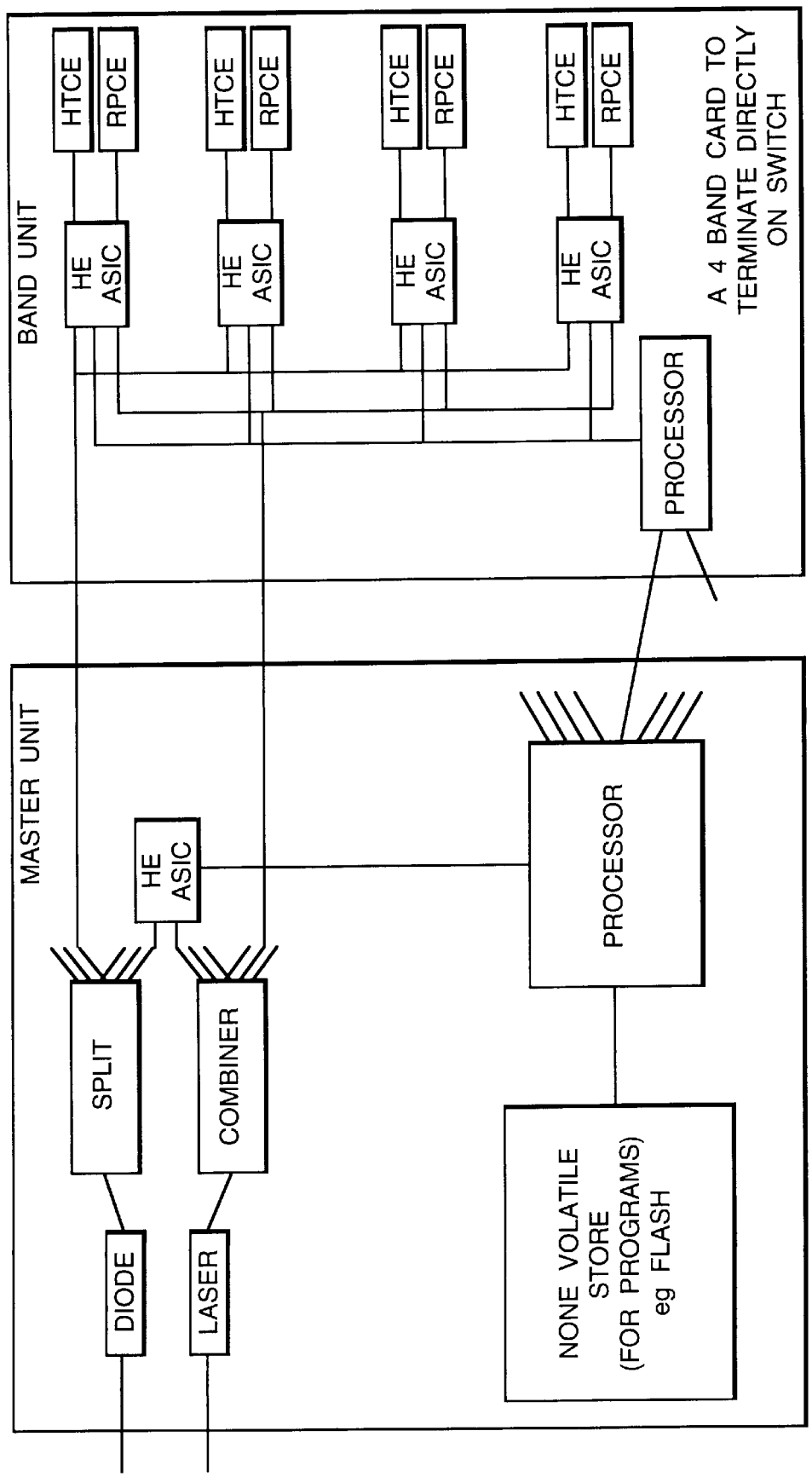
FIG. 7 shows a block diagram of a head end master unit and a band unit.

Equipment (see FIG. 7)

The Master unit splits the incoming signal to the start-up band to go to each band unit possibly also a test access point. The Master unit has a laser and a pin diode to send/receive data and a HE ASIC as described above. This does not have any direct communication with the switch, only with the processor. The processor has a non volatile store for its own programs and for the NT programs and can communicate with the processors on each of the band unit cards.

On each band unit card, there is a HE ASIC per band and a processor. This processor can send and receive cells as required for general purpose control and as a communication path for the master unit. Beyond the HE ASIC there could be a direct switch interface as in FIG. 7 or SDH interfaces.

FIG. 7 assumes that it is appropriate to use a common Laser/Diode and to mix the SCM signals electrically. If this proves not to be the case, then each band could have its own Laser/Diode and the splitting and combining could be done optically.

The Master Unit

This handles start-up and general configuration. Many parts of the HE ASIC would not be used, but there would be no point in developing a special unit for the master unit. The only feature in the ASIC for this unit is the ability to do initial ranging.

The Band Unit

This handles traffic for 4 bands. It is assumed that one processor is sufficient for 4 bands, as it is not involved with the handling of normal traffic. The processor has links to 2 master units. The processor has a limited boot ROM and loads its code from the master unit on start-up.

Master Unit Software

This software performs the following functions:
Loading and control of the band units.
Start-up, initial ranging and downloading of the NTs.
General control of the access network.

This communicates with NTs after they have been assigned to a band through the appropriate band unit. It also communicates with the access management through an ATM link from a band unit.

Band Unit Software

This performs the following functions:
Relaying messages from the master unit to NTs and the ATM network.
Updating the ranging of the NT.
Handling broadcast channel assignment.
Handling scrambling.
Handling whatever is beyond the Xb/UTOPIA interface.
Handling "V6" protocols and related activities

POTS

The POTS handling is to perform the following main functions:

Handle the special form of the Low delay POTS sent through the upstream control slot.

Do protocol handling for "V6" interfaces.

Rearrange 64K timeslots in 2M streams to enable the customer to have one 2M link yet access more than one operator across the V6 interface.

To perform these there is a small 64K switch in each direction and a means to extract and insert High-Level Data Link Control (HDLC) based protocols from the timeslots 16. This is then fed from the processor on each Band Unit. At a minimum the function has to handle three 2M streams and allow for other operators, and V6 handling this would have to be increased.

At a minimum the structure should take the three 2M streams from the network, load them into a small timeswitch, extract Timeslot 16 (TS16), run HDLC over TS16 and generate specially formatted POTS cells to the NTs with each octet for a different channel separately scrambled. In the reverse direction it needs to pick up the 2 POTS channels from the control slot and load these into a small timeswitch, the "D" channel may need processing, and from the processor HDLC should be generated and switched into TS16 of the outgoing 2M streams. It may be necessary to be able to send and receive HDLC streams from the customer end as well. To handle a limited number of other operators for basic POTS the number of streams into the network may need to be increased. To be totally flexible on all 2M steams from PBXs etc would require significant processing which would need special hardware backed by the power of some GPs to do the job.

Flow Control

The flow control could be implemented by a small embedded processor. This would given the unit considerable flexibility. This takes in the future cell requests from the NTs and knows what it has previously controlled. Up to a distance of 200 km this protocol can support cases where all the bandwidth is used by a single NT. At distances greater than 200 km, the maximum sustained bandwidth is limited for each NT. The traffic at each priority drops off in the way shown in FIG. 21. Note that the full bandwidth is still available, the limitation is on the bandwidth from a single NT.

The NT submits a request each time it has an opportunity for up to 63 cells of low priority and 63 cells of high priority traffic. The head end holds this request and cycles through the NTs serving the high priority requests and then low priority requests. For each NT it holds a count of the number of cells it has accepted. The following and FIG. 22 give an algorithm it could operate, others are possible.

This algorithm may be best provided by a small embedded processor within the Head End ASIC.

Initialisation of Flow Control Algorithm

For each NT there is a count of cells it has accepted from that NT, incremented each time it tells that NT to send a cell, decremented each time that the corresponding upstream cell arrives.

Then for each priority there are the following:
A count of cells wanted.
An indication of if the NT is active (linked).
Next/previous Links so that the active NTs can be in a linked list.
A head of the Linked list Handling of Cell Requests from the NT The handling of High and low priority is independent. If there are more requests than currently accepted cells, the cells wanted is updated. If the NT is not in the list of active NTs it is linked in. The algorithm is shown in FIG. 22.

Figure 23:
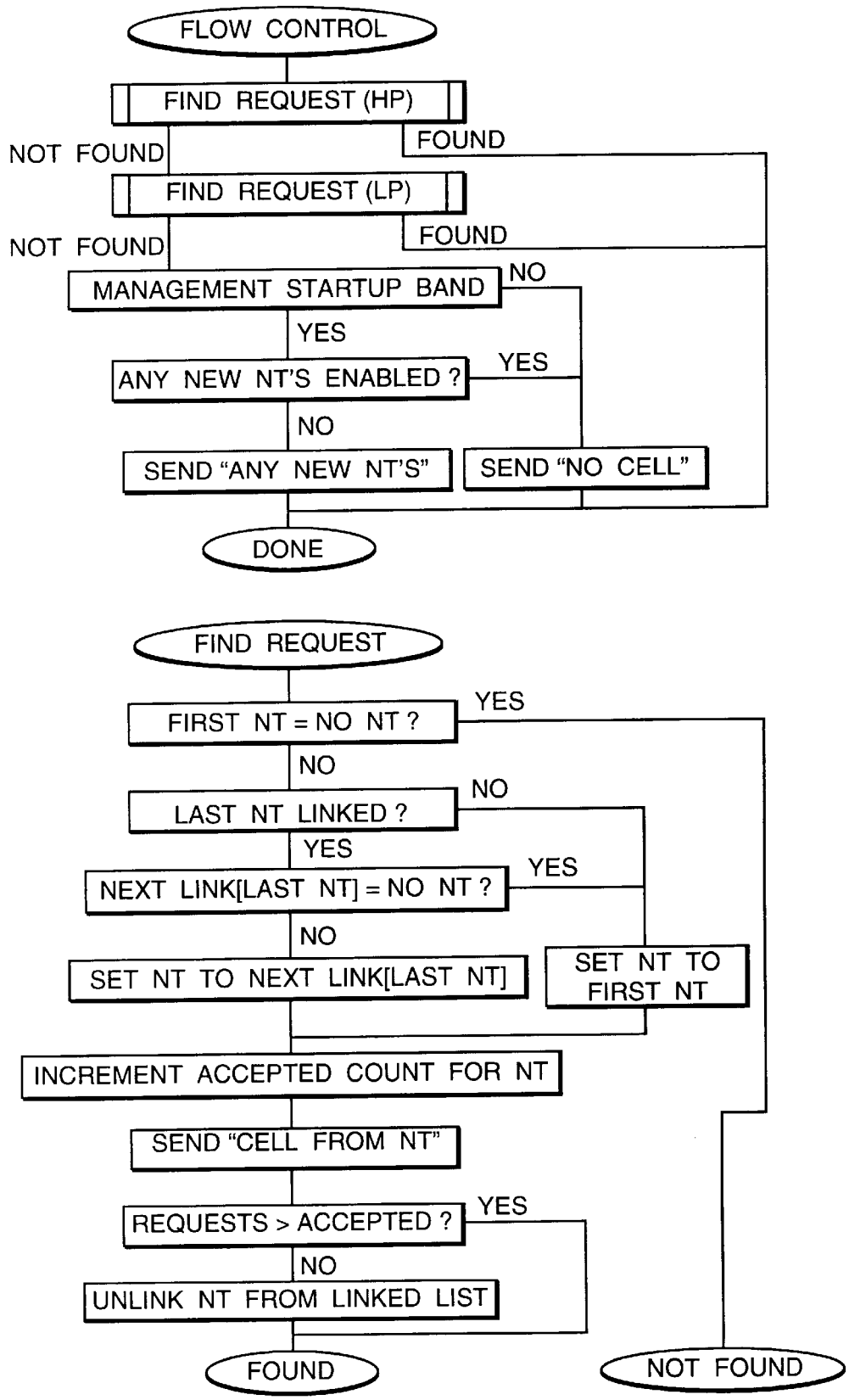
FIG. 23 shows the algorithm for flow control commands.

Sending Flow control commands (See FIG. 23)

If there are High priority cells requested then they will be chosen in a round robin way. If there are Low priority cells then these are handled. If there are no cells and it is operating in the start-up band it may send the "Any New NTs" if the control processor has told it too. The complex linked lists avoid any need to search for which NT is next.

Actions when cell received from the NT

Figure 24:
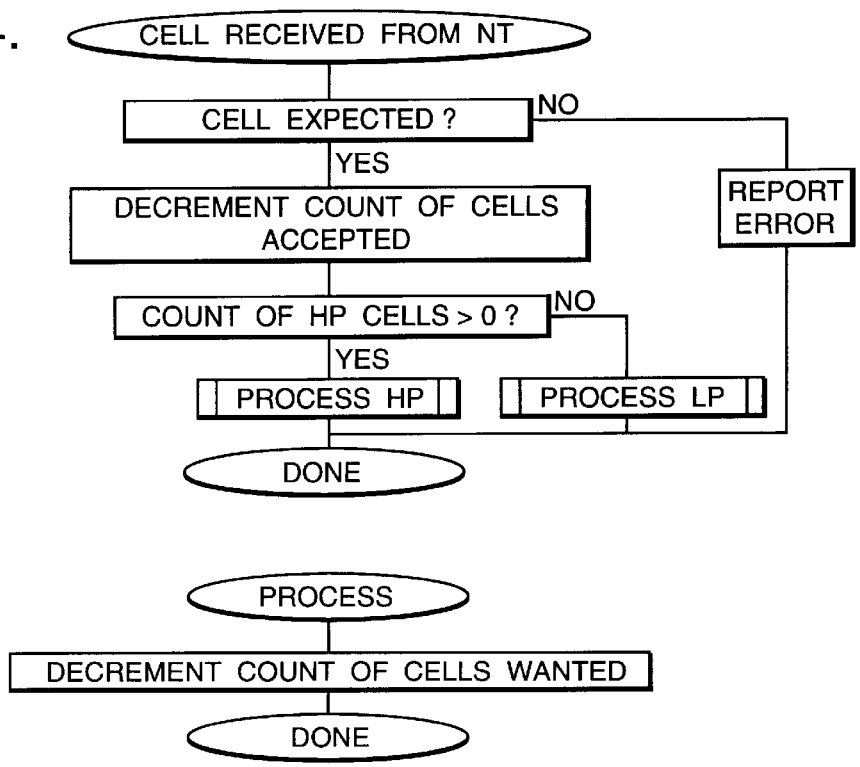
FIG. 24 shows the algorithms for actions when a cell is received by a head end unit from a network termination.

If no cell was expected then it is an error. Otherwise the count of accepted cells is decremented, and the count of requests on either the High or low priority count is decremented as in the algorithm shown in FIG. 24.

USING WDM

The basic concept described above concentrated on using multiple sub carriers on a single wavelength. This can be easily extended as a concept to support multiple wavelengths as technology and demand allows.

This assumes that the system uses tuneable Wave Division Multiplex (WDM) right down to the customers NT. There may be alternatives but they are unlikely to be as flexible. The only components between the head end and the NTs would be splitters and amplifiers.

Initially the system uses sub carriers on a single wavelength, each one supporting a band. Support for more customers depends on the availability of optic amplifiers and WDM components.

Optic Amplifiers

Optic amplifiers are available now and the technology is suitable for mass production. The price of these is likely to fall dramatically, as the mass production is used. An optic amplifier is expected to cost around £1000 or US $1500 in the near future. These amplifiers operate over a 30 nm window. It is possible to combine amplifiers and splitters in a single unit and achieve some additional gain, without having problems with laser safety.

This could be used to enable the above concept to feed a lot of customers allowing for power loss on fibres.

Availability of WDM

There are two basic types of WDM:

Using a relatively wide 2 nm window per carrier which can be provided using technology that is cheap to produce and is suitable for mass deployment. This could achieve about 12 wavelengths in the 30 nm amplification window. It is very easy to tune.

Using very narrow windows, using gratings or similar techniques the 30 nm window could support 50–100 wavelengths. This technology is currently very expensive and is difficult to tune.

INTRODUCING WDM TO AN INSTALLED SYSTEM

Taking the availability of optic amplifiers and WDM in to account, the following paths may be appropriate.

N is the number of customers that can be supported on a PON without amplification. This is limited by safety and may be 32.

C is the number of carriers on a wavelength which depends on the modulation used. 10 assumes a relatively simple modulation, 20 assumes more complex modulation. More powerful modulation may be used on higher technology wavelengths.

W is the number of wavelengths supported. This is 12 with relatively cheap components. It may be desirable to reserve some of this for narrow window WDM when it comes available.

Case 1—Wide window WDM available from the beginning

The NTs should be provided with tuneable WDM, even if it is not used. Initially up to N (32) customers can be supported from a single head end, carrying a few bands. The NTs would tune (if at all) to one wavelength, this is used for both start-up and traffic bands.

With the addition of Optic Amplifiers at a suitable split point, many more bands could be used limited only by the number of bands that can be carried. This could reach 32×(C−1) customers (288).

By supplying a number of lasers and WDM components at the head end, the system could make use of many wavelengths allowing at least 32×((C*W)−1) customers (3808). By using more complex modulation or better WDM this could be raised further.

By control of the bands lower technology (early) NTs could be mixed with higher technology (later) NTs on the same system.

Case 2—WDM not available from the beginning

This is more complex as WDM filters will have to be added in the field after the initial deployment.

The first two stages of deployment is as for case 1. After which WDM filters have to be added to support the initially deployed NTs. Assuming that it is not practical to change out the NTs, WDM filters will have to be added at suitable places in the network to work with the installed NTs. This may be coupled with amplification and splitting points. Once filters have been deployed then additional NTs can be added using WDM, but care has to be taken to ensure that the WDM compatible NTs are not hidden behind network filters.

Head End Lasers

To deploy a large system, using many wavelengths it is not practical to use a common laser. There has to be at least one laser per wavelength. It is probably simpler to have a laser per band, these then do not have to worry about linearity, and allow freedom of band units to operate on any band of any wavelength.

Each band unit would have its own laser, these would be combined and amplified to send the information to line. Likewise the receiving side would amplify, split and provide receivers on each band unit.

What is claimed is:

1. A communications network using asynchronous transfer mode (ATM) data transmission, comprising:

a head end connected, and operative for transmitting control and traffic data, to a plurality of groups of network terminations over a frequency spectrum divided into a number of frequency bands, one of the bands being a start-up band reserved for transmitting the control data for start-up and configuration of the network terminations, others of the bands being traffic bands assigned to the groups for transmission of the traffic data, the head end including means for identifying a respective network termination over the start-up band, for allocating one of the traffic bands to the identified network termination, and for instructing the identified network termination to tune to the allocated one of the traffic bands for traffic data transmission, each of the network terminations being operative for bidirectionally transmitting the traffic data over the allocated one of the traffic bands from and to the head end subsequent to said start-up and configuration.

2. The network as claimed in claim 1, wherein the head end includes a master unit operative for transmitting and receiving the control data over the start-up band, and a plurality of band units operative for transmitting and receiving the traffic data in accordance with the ATM data transmission.

3. The network as claimed in claim 1, wherein each traffic band is divided into a plurality of timeslots, and wherein the head end is also operative for allocating one of the timeslots in the allocated one of the traffic bands to the identified network termination for communication with the head end.

4. The network as claimed in claim 1, wherein the identifying means is operative for establishing an identity of the respective network termination, and a range of the respective network termination relative to the head end; and wherein the head end is also operative for advising the identified network termination of said range.

5. The network as claimed in claim 1, wherein each of the network terminations includes a plain old telephone system (POTS) line.

6. The network as claimed in claim 5, wherein each of the network terminations further includes a single interface adapter.

7. The network as claimed in claim 5, wherein each of the network terminations further includes a serial ATM interface.

8. The network as claimed in claim 7, wherein the ATM interface is connected to a plurality of terminal adapters.

9. The network as claimed in claim 7, wherein the ATM interface is connected to a switch.

10. The network as claimed in claim 1, wherein each group has a downstream logical ATM pipe from the head end to the network terminations of a predetermined capacity, and an upstream logical ATM pipe from the network terminations to the head end of a capacity less than the predetermined capacity.

11. The network as claimed in claim 10, wherein the capacity of the upstream pipe is 51 Mbit/s, and wherein the capacity of the downstream pipe is 155 Mbit/s.

12. The network as claimed in claim 10, wherein the pipes are optical fibers.

* * * * *